United States Patent
Chisholm et al.

(10) Patent No.: US 7,932,299 B2
(45) Date of Patent: Apr. 26, 2011

(54) ADVANCED SOLID ACID ELECTROLYTE COMPOSITES

(75) Inventors: Calum Chisholm, Pasadena, CA (US); Sossina M. Haile, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 12/268,202

(22) Filed: Nov. 10, 2008

(65) Prior Publication Data

US 2010/0330455 A1 Dec. 30, 2010

Related U.S. Application Data

(63) Continuation of application No. 11/485,715, filed on Jul. 12, 2006, now abandoned.

(60) Provisional application No. 60/699,018, filed on Jul. 13, 2005.

(51) Int. Cl.
*C08J 5/20* (2006.01)
*H01M 2/14* (2006.01)
*C08B 15/16* (2006.01)

(52) U.S. Cl. ......... 521/27; 423/305; 423/306; 423/307; 423/308; 423/309; 252/62.2; 252/500; 429/129

(58) Field of Classification Search ............... 521/27; 429/33, 304, 129; 252/62.2, 500; 423/305–310, 423/311

See application file for complete search history.

(56) References Cited

U.S. PATENT DOCUMENTS

| | | | | |
|---|---|---|---|---|
| 5,576,115 A | * | 11/1996 | Capuano et al. | 252/62.2 |
| 6,059,943 A | * | 5/2000 | Murphy et al. | 204/296 |
| 6,468,684 B1 | * | 10/2002 | Chisholm et al. | 429/492 |
| 6,716,548 B1 | * | 4/2004 | Kaliaguine et al. | 429/493 |
| 7,125,621 B2 | * | 10/2006 | Haile et al. | 429/491 |
| 7,255,962 B2 | * | 8/2007 | Chisholm et al. | 429/129 |
| 2003/0008190 A1 | * | 1/2003 | Chisholm et al. | 429/33 |

OTHER PUBLICATIONS

S. Lucas et al. "Rare earth phosphate powders RePO4*nH20 (Re=La, Ce or Y)—Part I. Synthesis and characterization", J. of Solid State Chem., 177 (2004), p. 1302-1311, (available on www.sciencedirect.com).*

* cited by examiner

*Primary Examiner* — Michael M Bernshteyn
(74) *Attorney, Agent, or Firm* — Kilpatrick Townsend & Stockton LLP

(57) ABSTRACT

Solid acid/surface-hydrogen-containing secondary component electrolyte composites, methods of synthesizing such materials, electrochemical device incorporating such materials, and uses of such materials in fuel cells, membrane reactors and hydrogen separations are provided. The stable electrolyte composite material comprises a solid acid component capable of undergoing rotational disorder of oxyanion groups and capable of extended operation at a wide temperature range and a secondary compound with surface hydrogen atoms, which when intimately mixed, results in a composite material with improved conductivity, mechanical and thermal properties, when compared to pure solid acid compound.

17 Claims, 6 Drawing Sheets

4A

4B

ADVANCED SOLID ACID ELECTROLYTE COMPOSITES

CROSS-REFERENCES TO RELATED APPLICATIONS

This application is a continuation of U.S. patent application Ser. No. 11/485,715, filed Jul. 12, 2006, which claims priority to U.S. Provisional Patent Application No. 60/699,018, filed on Jul. 13, 2005; the contents of each are hereby incorporated by reference in its entirety for all purposes.

STATEMENT AS TO RIGHTS TO INVENTIONS MADE UNDER FEDERALLY SPONSORED RESEARCH OR DEVELOPMENT

This work was support in part by a grant from the National Science Foundation, DMR-0413946. The government may have rights in certain aspects of this invention

BACKGROUND OF THE INVENTION

Electrochemical devices depend on the flow of protons, or the flow of both protons and electrons, though a proton conducting material, such as a membrane. Accordingly, materials which conduct protons, or both protons and electrons, have applications as electrolytes or electrodes in a number of electrochemical devices including fuel cells, hydrogen pumps, supercapacitors, sensors, hydrogen separation membranes and membrane reactors.

An important use for these materials is in fuel cells. Fuel cells are attractive alternatives to combustion engines for power generation, because of their higher efficiency and the lower level of pollutants produced from their operation. A fuel cell generates electricity from the electrochemical reaction of a fuel, e.g. methane, methanol, gasoline, or hydrogen, with oxygen normally obtained from air.

There are three common types of fuel cells i.e., 1) direct hydrogen/air fuel cells, in which hydrogen is stored and then delivered to the fuel cell as needed; 2) indirect hydrogen/air fuel cells, in which hydrogen is generated on site from a hydrocarbon fuel, cleaned of carbon monoxide, and subsequently fed to the fuel cell; and 3) direct alcohol fuel cells, such as methanol ("DMFC"), ethanol, isopropanol and the like, in which an alcohol/water solution is directly supplied to the fuel cell. An example of this later fuel cell was described, for example, in U.S. Pat. No. 5,559,638, the disclosure of which is incorporated herein by reference.

Regardless of the fuel cell design chosen, the operating efficiency of the device is partly limited by the efficiency of the electrolyte at transporting protons. Typically, perfluorinated sulphonic acid polymers, polyhydrocarbon sulfonic polymers, and composites thereof are used as electrolyte membrane materials for fuel cells. However, these conventional materials utilize hydronium ions ($H_3O^+$) to facilitate proton conduction. Accordingly, these materials must be hydrated, and a loss of water immediately results in degradation of the conductivity of the electrolyte and therefore the efficiency of the fuel cell. Moreover, this degradation is irreversible, i.e., a simple reintroduction of water to the system does not restore the conductivity of the electrolyte.

As a result, fuel cells utilizing these materials require peripheral systems to ensure water recirculation and temperature control to keep the water from evaporating. These peripheral systems increase the complexity and cost of these fuel cells, from the use of expensive noble catalysts (Pt) to temperature requirements that cannot exceed much above 100° C. As a result of these temperature limitations, the fuel cell catalysts and other systems cannot be operated to maximum efficiency. Higher temperatures can also reduce carbon monoxide poisoning of the fuel cell catalyst.

It has recently been shown that the solid acids such as $CsHSO_4$ can be used as the electrolyte in fuel cells operated at temperatures of 140-160° C. (Haile, S. M., et al. *Nature* 2001, 410, 910-913). Use of this material greatly simplifies fuel cell design relative to polymer electrolyte fuel cells because hydration of the electrolyte is not necessary and, because of the elevated temperature of operation, residual CO in the fuel stream can be better tolerated. The high conductivity of $CsHSO_4$ and analogous materials results from a structural phase transition (referred to as a superprotonic phase transition) that occurs at 141° C. from an ordered structure, based on chains of $SO_4$ groups linked by well-defined hydrogen bonds, to a disordered structure in which $SO_4$ groups freely reorient and easily pass protons between one another. Across this transition, the protonic conductivity increases by 3 to 4 orders of magnitude from $10^{-6}\ \Omega^{-1}cm^{-1}$ (phase II) to $10^{-3}$-$10^{-2}\ \Omega^{-1}cm^{-1}$ (phase I; Baranov, A. I., et al. JETP Lett. 1982, 36(11), 459-462). Thus, disorder in the crystal structure is a key prerequisite for high proton conductivity.

However, the lifetime of these sulfate and selenium based solid acids is short (Merle, R. B., et al. *Energy & Fuels* 2003, 17, 210-215). The short lifetime of both $CsHSO_4$ and $CsHSeO_4$ under fuel cell operating conditions results from the reduction of sulfur and selenium by hydrogen in the presence of typical fuel cell catalysts, according to:

$$2CsHSO_4+4H_2 \rightarrow Cs_2SO_4+H_2S+4H_2O$$

$$2CsHSeO_4+4H_2 \rightarrow Cs_2SeO_4+H_2Se+4H_2O$$

Recently, it has been shown that $CsH_2PO_4$ has as superprotonic transition and is stable under fuel cell conditions (Boysen, D. A., et al. *Science* 2004, 303, 68-70). Although the compound meets the necessary conditions of long term chemical stability for operation as a fuel cell electrolyte, the compound is water soluble and only becomes useful as an electrolyte above its superprotonic phase transition (Baranov, A. I., et al. *Ferroelectrics* 1989, 100, 135-141). Therefore, a need exists for solid acid electrolyte materials with high proton conductivity over a large range of temperatures that are stable under fuel cell conditions.

BRIEF SUMMARY OF THE INVENTION

The present invention is directed to a proton conducting membrane comprising a stable electrolyte composite material having high protonic conductivity, improved mechanical properties and capability of extended operation at a wide range of temperatures; methods of preparing such a proton conducting membrane; devices incorporating such a membrane; and uses of such a membrane in applications, such as fuel cells, hydrogen separations, membrane reactors and sensors. In particular, the proton conducting membrane comprises a stable electrolyte composite material comprising a solid acid component, a surface-hydrogen-containing secondary component and an interface formed between the solid acid component and the secondary component. The composite material has improved mechanical property. The secondary component can improve the mechanical stability of solid acid electrolyte membrane with respect to thermal creep by reducing the propensity of solid acids to plastically deform both at ambient and elevated temperatures. The interactions between the solid acid surface and the surface of the secondary compound can also stabilize the surface of the solid acid with respect to dehydration, thus allowing operation of the electrochemical device using the composite electrolyte to higher temperatures with respect to the same device using a solid acid compound alone as its electrolyte. Advantageously, the composite material can have one or more features or advantages, such as, for example, high conductivity from near ambient to elevated temperature; mechanically stabilizing with respect to thermal creep; kinetically stabilizing with respect to dehydration; and increased conductivity in its superprotonic phases.

According to one aspect, the present invention provides a proton conducting membrane. The membrane includes a solid acid component capable of conducting protons in a solid state through a superprotonic mechanism, a secondary component having surface hydrogen, and a plurality of interfaces formed by the solid acid component and the secondary component. In one embodiment, the interfaces are formed by hydrogen bonding interactions between the solid acid component and the secondary component. In another embodiment, the proton conducting membrane further includes a structural binder selected from, for example, carbon materials, graphite, a polymer, a ceramic, glass, a metal, a nanostructure or a mixture thereof. In yet another embodiment, the proton conducting membrane further includes a separate electrically conducting material.

According to another aspect, the present invention provides a proton conducting membrane having a plurality of solid acid particles capable of conducting protons in a solid state through a superprotonic mechanism, a plurality of secondary component particles having surface hydrogen, and a plurality of interfaces formed by the solid acid particles and the secondary component particles. In one embodiment, the interfaces are formed by hydrogen bonding interactions between the solid acid particles and the secondary component particles. In another embodiment, the proton conducting membrane includes a structural binder selected from, for example, carbon materials, graphite, a polymer, a ceramic, glass, a metal, a nanostructure or a mixture thereof.

According to yet another aspect, the present invention provides a proton conducting membrane made by contacting a solid acid component and a secondary component having a plurality of surface hydrogen under conditions sufficient to generate a composite, wherein the solid acid interact with the secondary component to form a plurality of interfaces.

In one embodiment, the proton conducting membrane of the present invention comprises a solid acid having the formula: $M_aH_b(XO_t)_c$; a secondary component having surface hydrogen and selected from the group consisting of a polymer and ceramic; and a plurality of interfaces formed between the solid acid and the secondary component, wherein M is a cation having a charge from +1 to +7, preferably from +1 to +4, and more preferably from +1 to +3; X is selected from the group consisting of S, Se, P, As, Si, Ge, V, Cr and Mn; and a, b, t and c are each independently a non-negative real number, preferably from 1 to 15, more preferably from 1 to 9, and even more preferably from 1 to 4.

In another embodiment, the proton conducting membrane of the present invention comprises an eulytite solid acid, a secondary component having surface hydrogen a plurality of interfaces formed between the solid acid and the secondary component.

In yet another embodiment, the proton conducting membrane of the present invention comprises a solid acid; a secondary component having the formula: $M'_d(X'O_y)_e*nH_2O(H_fX''O_z)_g$; and a plurality of interfaces formed between the solid acid and the secondary component, wherein M' is a cation having a charge from +1 to +7, preferably from +1 to +4, and more preferably from +1 to +3; X' and X'' are each independently selected from the group consisting of S, Se, P, As, Si, Ge; n and g are non-negative real numbers; and d, e, f, y and z are each independently a non-negative real number, preferably from 1 to 15, more preferably from 1 to 9, and even more preferably from 1 to 4.

According to still another aspect, the present invention provides a method for preparing a proton conducting membrane. The method includes contacting a solid acid component with a secondary component having a plurality of surface hydrogen to generate a composite, wherein the solid acid interacts with the secondary component to form a plurality of interfaces.

According to still yet another aspect, the present invention provides a method of rehydrating a solid acid composite. The method includes contacting the solid acid composite with a water molecule under conditions sufficient for rehydrating.

According to a further aspect, the present invention provides a method of melt-processing. The method includes contacting a solid acid with a preformed membrane, of the secondary component, in a melting state.

According to yet another aspect, the present invention provides a fuel system comprising a proton conducting membrane. The membrane includes a solid acid component, a secondary component and a plurality of interfaces formed by the solid acid and the secondary component. The fuel cell system provides electrical power to an external device.

According to a further aspect, the present invention provides a use of the proton conducting membrane for hydrogen separation and in a device selected from the group consisting of a fuel cell, a membrane reactor and a sensor.

These and other embodiments, aspects and advantages of the present invention will become better understood with reference to the following description, claims and accompanying Figures.

BRIEF DESCRIPTION OF THE DRAWINGS

FIG. 4A shows a top view of SC(0001) down the hexagonal axis. FIG. 4B shows a side view of the structure schematically absorbed species (represented by small spheres) on both Si and C surfaces (represented by large and medium spheres), respectively.

DETAILED DESCRIPTION OF THE INVENTION

I. Definitions

Figure 1:
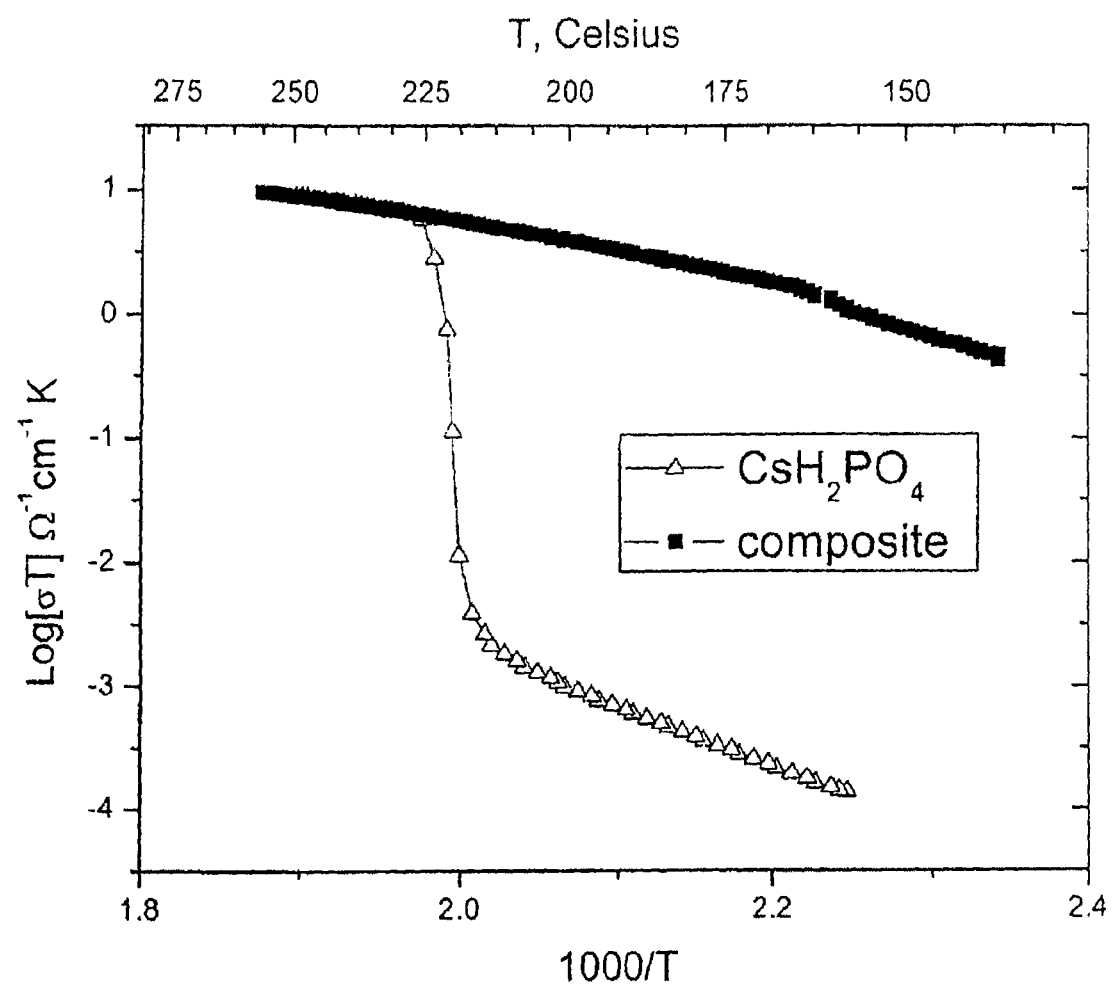
FIG. 1 illustrates a comparison of conductivity of pure $CsH_2PO_4$ versus a $CsH_2PO_4/LaPO_4*nH_2O(H_3PO_4)_g$ composite, where n and g are non-negative real numbers. The composite has higher or equal conductivity to that of pure $CsH_2PO_4$ at all measured temperatures. Measurements were taken upon cooling at 1° C./min, under flowing air atmospheres with a partial pressure ~0.7 atm.

As used herein, the term "metal cation" includes to elements of the periodic table that are metallic or semi-metallic and positively charged as a result of having fewer electrons in the valence shell than are present for the neutral metallic element. Metals that are useful in the present invention include, but are not limited to, the alkali metals, alkaline earth metals, transition metals, the lanthanides, and post-transition metals.

As used herein, the term "proton conducting membrane" includes to a matrix of material that is capable of conducting protons through the matrix. In some embodiments, the proton conducting membrane can also conduct electrons. Proton conducting membranes of the present invention comprise solid acid composites and, optionally, a material that binds the composite together.

As used herein, the term "solid acid" includes to compounds, in particular, inorganic compounds, which have properties that are intermediate between those of a normal acid, such as, $H_2SO_4$, and a normal salt, such as $Cs_2SO_4$. In general, the chemical formula of the solid acids of the type used according to the present invention can be written as a combination of the salt and the acid, such as, $M_aH_b(XO_t)_c$, where M is metal, $XO_t$ is oxyanion, subscripts a, b and c are non-negative real numbers. An example of a solid acid is $CsH_2PO_4$. The solid acid used in the present invention have structural hydrogen, which are superprotonic. A further example of the solid acid is a compound having eulytite structure, for example, with a space group $I\bar{4}3d$. Solid acids have properties that are intermediate between those of a normal acid, such as, $H_2SO_4$, and a normal salt, such as, $Cs_2SO_4$. Solid acids generally comprise oxyanions, such as, $SO_4^{2-}$, $SO_3^{2-}$, $SeO_4^{2-}$, $SeO_3^{2-}$, $PO_4^{3-}$, $PO_3F^{2-}$, $PO_3H^{2-}$, $AsO_4^{3-}$, $SiF_6^{2-}$ or $AlF_6^{3-}$, $SiO_4^{4-}$, $GeO_4^{4-}$, $SeO_4^{4-}$, $CrO_4^{2-}$, $VO_4^{3-}$, $MnO_4^{2-}$, $MnO_4^{-}$, $WO_4^{2-}$, $MoO_4^{2-}$, $BF_4^{-}$, $PF_6^{-}$ and $SbF_6^{-}$, and the like, which are linked together via O . . . H . . . O hydrogen bonds. In addition, they contain cations for overall charge balance. The structure can contain more than one type of oxyanion $XO_4$, $XO_3$, $XO_3A$, $XF_4$ or $XF_6$ group, and can also contain more than one type of cation M species.

As used herein, the term "superprotonic" includes to a phase transition from an ordered structure to a disordered structure accompanying by a significant increase in proton conductivity. For example, $CsHSO_4$ undergoes superprotonic transition at 141° C. with an increase in proton conductivity by 3 to 4 orders of magnitude from $10^{-6}\ \Omega^{-1}cm^{-1}$ to $10^{-3}$-$10^{-2}\ \Omega^{-1}cm^{-1}$.

As used herein, the term "structural binder" includes to a matrix material that enhances the mechanical integrity and/or chemical stability of the proton conducting membrane. Structural binders useful in the present invention include, but are not limited to, carbon, graphite, a polymer, ceramic, glass, silicon dioxide (e.g., quartz), a semiconductor, a nanostructure, a metal and a mixture thereof. The structural binder can be electrically conducting or insulating. When the structural binder is electrically conducting it can conduct protons, electrons or both, such that the proton conducting membrane can conduct either protons across the membrane, or both protons and electrons across the membrane. Alternatively, the structural binder can be ionically conducting.

As used herein, the term "non-negative real number" includes to any number (e.g., whole or fractions) that is either a positive number or zero. The non-negative real numbers are selected such that the inorganic solid acids or the secondary component inorganic compounds are charge neutral.

II. General

The present invention is directed to a proton conducting membrane comprising a stable electrolyte composite material. The composite material comprises a solid acid component, a secondary component and a plurality of interfaces formed by the solid acid and the secondary component. In one aspect, the solid acid and the secondary component can exist as particles of micrometer or nanometer dimensions with enhanced interactions between the solid acid and the secondary component. In some embodiments, the interfaces are formed by hydrogen bonding interactions between the solid acid and the secondary component. In other embodiments, the membrane further comprises a structural binder. The solid acid composite or the proton conducting membrane can be made by contacting a solid acid component with a secondary component having a plurality of surface hydrogen under conditions sufficient to generate a composite, wherein said solid acid component interacts with said secondary component to form a plurality of interfaces. Advantageously, the solid acid composites have one or more features or advantages, for example, high protonic conductivity; mechanically stabilizing with respect to thermal creep; kinetically stabilizing with respect to dehydration; and increased conductivity in their superprotonic phases.

The current invention is directed to solid acid composites that have high efficiency and do not suffer reduction in the presence of catalytic materials, such as Ru, Pt and other transition metals, are stable in a liquid water environment, and have high proton conductivity over a large range of temperatures. In particular, some solid acids composites are likely to express superprotonic conductivity from or even below ambient temperatures to elevated temperatures i.e., up to the dehydration point of the particular compound. These advantageous properties are attributed to the stabilizing effect of the secondary component and the formation of extended hydrogen bonding network interfaces. Also, certain oxyanions, such as $PO_4$ and $SiO_4$ have shown better stabilities to reduction in the presence of catalytic materials than other oxyanions. For example, replacing S or Se in the superprotonic solid acids with elements, such as P and Si results in the elimination of the reduction reaction because analogous reduction products, such as $H_3P$ and $H_4Si$ are extremely unstable (Merle, R. B. et al. *Energy & Fuels* 2003, 17, 210-215; Boysen, D. et al. *Science* 2004, 303, 68-70).

III. Composite Material

The solid acid component can be organometallic compounds, inorganic compounds or mixtures thereof. Preferably, the solid acids are compounds that are stable at an elevated temperature and can undergo superprotonic transitions. More preferably, the solid acids are inorganic compounds that can undergo superprotonic phase transitions. The superprotonic transition can take place at an ambient temperature, for example, about 20° C. or less, or at an elevated temperature, for example, greater than 130° C., such as in the range of 140° C. to 450° C. An exemplary example of such solid acid is $CsH_2PO_4$.

The solid acids used herein are inorganic compounds containing one or more cations and one or more anions whose properties are intermediate between those of a normal acid, such as $H_2SO_4$ and a normal salt, such as $Cs_2SO_4$. An example of a solid acid is $CsHSO_4$. In one aspect, the chemical formula of the solid acids can be written as a combination of the salt and acid. The cation can be a metal cation or non-metal cation, such as $NH_4^+$.

In some embodiments, the solid acids are comprised of oxyanions, which are linked together via O—H . . . O hydrogen bonds, dipolar interactions, van der Waals interactions, ionic interactions or combinations of the foregoing interactions. preferably, the solid acids are linked via O—H . . . O hydrogen bonds. In certain embodiments, the structure can have more than one type of oxyanion.

Metals that are useful in the present invention include alkali metals, alkaline earth metals, transition metals, the lanthanides, and post-transition metals. Alkali metals include, for example, Li, Na, K, Rb and Cs. Alkaline earth metals include, but are not limited to, Be, Mg, Ca, Sr and Ba. Transition metals include, but are not limited to, Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg and Ac. The lanthanides include, for example, La, Ce, Pr, Nd, Pm, Sm, Eu, Dg, Tb, Dy, Ho, Er, Tm, Yb and Lu. Post-transition metals include, for example, B, Al, Ga, In, Ti, Ge, Sn, Pb, Sb, Bi, and Po. Additional metals include the semi-metals. One of skill in the art will appreciate that many of the metals described above can each adopt several different oxidation states, all of which are useful in the present invention. In some instances, the most stable oxidation state is formed, but other oxidation states are also useful in the present invention. Metal cations useful in the present invention include, but are not limited to, metal cations having a 1+ charge, a 2+ charge, a 3+ charge, a 4+ charge, a 5+ charge, a 6+ charge and a 7+ charge. Metal cations having other charges are also useful in the present invention. The compounds of the present invention can include more than one type of metal.

Useful elements for the oxyanions of the compounds of the present invention include, but are not limited to, B, P, Si, As, Ge, S, Se, Sb, W, Cr, Mn and V. Some of the useful cations of these elements include, but are not limited to, $B^{3+}$, $P^{4+}$, $P^{5+}$, $Si^{4+}$, $As^{5+}$, $Ge^{4+}$, $S^{4+}$, $S^{5+}$, $S^{6+}$, $Se^{4+}$, $Se^{6+}$, $Sb^{6+}$, $W^{3+}$, $W^{4+}$, $W^{5+}$, $W^{6+}$, $Cr^{6+}$, $V^{4+}$, $V^{5+}$, $Mn^{2+}$, $Mn^{4+}$, $Mn^{6+}$ and $Mn^{7+}$. One of skill in the art will appreciate that other elements and charge states are also useful for the oxyanions of the present invention.

Oxyanions useful in the present invention include, but are not limited to, $SO_4^{2-}$, $SO_3^{2-}$, $SeO_4^{2-}$, $SeO_3^{2-}$, $PO_4^{3-}$, $PO_3F^{2-}$, $PO_3H^{2-}$, $AsO_4^{3-}$, $SiF_6^{2-}$ or $AlF_6^{3-}$, $SiO_4^{4-}$, $GeO_4^{4-}$, $SeO_4^{4-}$, $PO_3^{4-}$, $CrO_4^{2-}$, $VO_4^{3-}$, $MnO_4^{2-}$, $MnO_4^{-}$, $WO_4^{2-}$, $MoO_4^{2-}$, $PF_6^-$ and $SbF_6^-$. In some embodiments, the oxyanions are linked together via O—H . . . O hydrogen bonds. In certain other embodiments, the oxyanions can be linked together via O—H . . . O hydrogen bonds, dipolar interactions, van der Waals interactions, ionic interactions or combinations of interactions. The compounds of the present invention can contain more than one type of oxyanions. One of skill in the art will appreciate that other oxyanions are also useful in the present invention.

In some embodiments, the solid acid component is a compound having formula I: $M_a H_b (XO_t)_c$, where M is a cation having a charge from +1 to +7, preferably, from +1 to +4, more preferably from +1 to +3, most preferably from +1 to +2; X is an element that can form oxyanions; and a, b, t and c are each independently a non-negative real number, preferably from 1 to 15, such as more preferably from 1 to 9, and even more preferably from 1 to 4, such as, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0. In some embodiments, M can be a metal cation, including, but not limiting to, alkali and alkaline metals, such as $Li^+$, $Be^{2+}$, $Na^+$, $Mg^{2+}$, $K^+$, $Ca^{2+}$, $Rb^+$, $Sr^{2+}$, $Cs^+$, $Ba^{2+}$; transition metals, such as, $Sc^{3+}$, $V^{3+}$, $V^{5+}$, $Cr^{3+}$, $Cr^{5+}$, $Mn^{2+}$, $Mn^{3+}$, $Mn^{6+}$, $Mn^{7+}$, $Fe^{2+}$, $Fe^{3+}$, $Co^+$, $Co^{2+}$, $Ni^{2+}$, $Cu^+$, $Cu^{2+}$, $Zn^{2+}$, $Y^{3+}$, $Nb^{3+}$, $Mo^{3+}$, $Mo^{6+}$, $Ta^{3+}$, $Ta^{5+}$, $W^{6+}$, $Ru^{2+}$, $Rh^{2+}$, $Rh^{3+}$, $Pd^{2+}$, $pd^{4+}$, $Ag^+$, $Cd^{2+}$, $Cd^{3+}$, $Ir^{3+}$, $Pt^{2+}$, $Pt^{4+}$, $Au^+$, $Au^{3+}$ and $Hg^+$ and $Hg^{2+}$; the lanthanides, such as $La^{3+}$, $Ce^{3+}$, $Pr^{3+}$, $Nd^{3+}$, $Pm^{3+}$, $Sm^{3+}$, $Eu^{3+}$, $Dg^{3+}$, $Tb^{3+}$, $Dy^{3+}$, $Ho^{3+}$, $Er^{3+}$, $Tm^{3+}$, $Yb^{3+}$ and $Lu^{3+}$; post-transition metals, such as $Al^{3+}$, $Ca^{3+}$, $In^+$, $In^{3+}$, $Tl^+$, $Tl^{3+}$, $Ge^{2+}$, $Sb^{3+}$, $Bi^{3+}$, $Sn^{2+}$ and $Pb^{2+}$; and mixtures thereof. Preferably, M is a metal cation selecting from the group consisting of $Li^+$, $Be^{2+}$, $Na^+$, $Mg^{2+}$, $K^+$, $Ca^{2+}$, $Rb^+$, $Sr^{2+}$, $Cs^+$, $Ba^{2+}$, $Mn^{2+}$, $Fe^{2+}$, $Co^+$, $Co^{2+}$, $Ni^{2+}$, $Cu^+$, $Cu^{2+}$, $Zn^{2+}$, $Ru^{2+}$, $Rh^{2+}$, $Pd^{2+}$, $Ag^+$, $Cd^{2+}$, $Pt^{2+}$, $Au^+$, $Hg^+$, $Hg^{2+}$, $In^+$, $Tl^+$, $Ge^{2+}$, $Sn^{2+}$, $Pb^{2+}$ and mixtures thereof. Alternatively, M is a non-metal cation, including, but not limiting to, for example, $NH_4^+$. In certain embodiments, X is an element selected from the group consisting of S, Se, P, As, Si, Ge, V, Cr, W and Mn. The solid acid component can also be a mixture of different kinds of solid acid. For example, the solid acid component is a compound having the formula $Cs_2(HSO_4)(H_2PO_4)$, which is a mixture of $CsHSO_4$ and $CsH_2PO_4$.

The solid acid component can be a compound having different types of cations and/or oxyanions. In some embodiments, the solid acid component is a compound having the formula Ia: $(M^A)_{a'}(M^B)_{a''}H_b(XO_t)_c$, where $M^A$ and $M^B$ are each independently a cation having +1 to +7 charge; preferably, from +1 to +4; and more preferably, from +1 to +3. Suitable cations include, but are not limited to, alkali and alkaline metals, such as $Li^+$, $Be^{2+}$, $Na^+$, $Mg^{2+}$, $K^+$, $Ca^{2+}$, $Rb^+$, $Sr^{2+}$, $Cs^+$, $Ba^{2+}$; transition metals, such as, $Sc^{3+}$, $V^{3+}$, $V^{5+}$, $Cr^{3+}$, $Cr^{5+}$, $Mn^{2+}$, $Mn^{3+}$, $Mn^{6+}$, $Mn^{7+}$, $Fe^{2+}$, $Fe^{3+}$, $Co^+$, $Co^{2+}$, $Ni^{2+}$, $Cu^+$, $Cu^{2+}$, $Zn^{2+}$, $Y^{3+}$, $Nb^{3+}$, $Mo^{3+}$, $Mo^{6+}$, $Ta^{3+}$, $Ta^{5+}$, $W^{3+}$, $W^{6+}$, $Ru^{2+}$, $Rh^{2+}$, $Rh^{3+}$, $Pd^{2+}$, $pd^{4+}$, $Ag^+$, $Cd^{2+}$, $Cd^{3+}$, $Ir^{3+}$, $Pt^{2+}$, $Pt^{4+}$, $Au^+$, $Au^{3+}$ and $Hg^+$ and $Hg^{2+}$; the lanthanides, such as $La^{3+}$, $Ce^{3+}$, $Pr^{3+}$, $Nd^{3+}$, $Pm^{3+}$, $Sm^{3+}$, $Eu^{3+}$, $Dg^{3+}$, $Tb^{3+}$, $Dy^{3+}$, $Ho^{3+}$, $Er^{3+}$, $Tm^{3+}$, $Yb^{3+}$ and $Lu^{3+}$; post-transition metals, such as $Al^{3+}$, $Ca^{3+}$, $In^+$, $In^{3+}$, $Tl^+$, $Tl^{3+}$, $Ge^{2+}$, $Sb^{3+}$, $Bi^{3+}$, $Sn^{2+}$, $Pb^{2+}$ and $NH_4^+$; and mixtures thereof. X is an element that can form oxyanions and selected from the group consisting of S, Se, P, As, Si, Ge, V, Cr, W and Mn. Each of the subscripts a', a'', b, t, and c is independently a non-negative real number, preferably from 1 to 15, more preferably from 1 to 9, and yen more preferably from 1 to 4, such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0. Preferred cations for $M^A$ and $M^B$ include, but are not limited to $Li^+$, $Be^{2+}$, $Na^+$, $Mg^{2+}$, $K^+$, $Ca^{2+}$, $Rb^+$, $Sr^{2+}$, $Cs^+$, $Ba^{2+}$, $Mn^{2+}$, $Fe^{2+}$, $Co^+$, $Co^{2+}$, $Ni^{2+}$, $Cu^+$, $Cu^{2+}$, $Zn^{2+}$, $Ru^{2+}$, $Rh^{2+}$, $Pd^{2+}$, $Ag^+$, $Cd^{2+}$, $Pt^{2+}$, $Au^+$, $Hg^+$, $Hg^{2+}$, $In^+$, $Tl^+$, $Ge^{2+}$, $Sn^{2+}$, $Pb^{2+}$, $NH_4^+$ and mixtures thereof. In more preferred embodiments, $M^A$ and $M^B$ are cations include, but are not limited to, one or more species selected from the group consisting of $Li^+$, $Be^{2+}$, $Na^+$, $Mg^{2+}$, $K^+$, $Ca^{2+}$, $Rb^+$, $Sr^{2+}$, $Cs^+$, $Ba^{2+}$ and $NH_4^+$. An exemplary of the solid acid of this type is $CsKHPO_4$. In another embodiment, the solid acid is a compound having the formula Ib: $(M^A)_{a'}(M^B)_{a''}(M^C)_{a'''}H_b(XO_t)_c$, where $M^A$, $M^B$ and $M^C$ are each independently a cation having a charge from +1 to +7; preferably from +1 to +4; and more preferably from +1 to +3. $M^A$, $M^B$ and $M^C$ are each independent cations and are selected from the group as defined above. X is the same as defined above. Each of the subscripts a', a'', a''', b, t, and c is independently a non-negative real number, preferably from 1 to 15, more preferably from 1 to 9, and even more preferably from 1 to 4, such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0. Examples of the solid acids include, but are not limited to, $CsH_2PO_4$, $Cs_2HPO_4$, $Cs_5(HSO_4)_3$ $(H_2PO_4)_2$, $Cs_2(HSO_4)(H_2PO_4)$, $Cs_3(HSO_4)_2(H_2PO_4)$, $Cs_3(HSO_4)_2(H_{1.5}(S_{0.5}P_{0.5})O_4)$, $Cs_3H_3(SO_4)_3 \cdot xH_2O$, $TlHSO_4$, $CsHSeO_4$, $Cs_2(HSeO_4)(H_2PO_4)$, $Cs_3H(SeO_4)_2(NH_4)_3H$ $(SO_4)_2$, $(NH_4)_2(HSO_4)(H_2PO_4)$, $Rb_3H(SO_4)_2$, $Rb_3H(SeO_4)_2$, $Cs_{1.5}Li_{1.5}H(SO_4)_2$, $Cs_2Na(HSO_4)_3$, $TlH_3(SeO_3)_2$, $BaH_2GeO_4$, $BaH_2SiO_4$, $CsH_2AsO_4(NH_4)_2(HSO_4(H_2AsO_4)$, $CaH_2SiO_4$, $CsH_5(PO_4)_2$, $CsHPO_3F$ and $CsHPO_3H$ The solid acids of the formulas I, Ia and Ib can undergo superprotonic transition at an elevated temperature, for example, $CsHSO_4$ and $CsH_2PO_4$ can undergo superprotonic transition at about 140° C. and 230° C., respectively. The structural hydrogens of the solid acids of the formulas I, Ia and Ib are capable of forming hydrogen bonding network with the secondary component, which has hydrogen bonding donors and acceptors.

In other embodiments, the solid acids have an eulytite structure with structural hydrogen, are superprotonic and have a space group of $I\bar{4}$ 3d, a body-centered cubic crystal structure having rotoinversion symmetry for every 90° of rotation about the face axis, a three-fold axis of symmetry down the body diagonal, and a diagonal glide with steps of one quarter unit cell edge in each direction.

In one embodiment, the solid acids are represented by formula II: $M_{4i}H_j(XO_k)_{3i}$, wherein M is at least one metal and each independently a metal cation. X is at least one member and each independently selected from the group consisting of P, Si, As, Ge, S, Se, W, Cr and V. In addition, each of subscripts i, j and k is independently a non-negative real number.

In another embodiment, the solid acids are compounds having the formula IIa: $M^{1+}_i M^{2+}_j M^{3+}_k M^{4+}_l M^{5+}_m H(3n+4O+2p-i-2j-3k-4l-5m)(X^{+5}O_4)_n(X^{+4}O_4)_o(X^{+6}O_4)_p$, wherein each M is a metal cation of the labeled charge state, and each X is an element selected from the group consisting of P, Si, As, Ge, S, Se, W, Cr and V, having the labeled charge state. In addition, each of subscripts i, j, k, l, m, n, o and p is a non-negative real number.

In yet another embodiment, the solid acids are compounds of the formula III: $M^{2+}_4H(XO_4)_3$, wherein $M^{2+}$ is a metal cation having a +2 charge. For example, compound $Ba_4H(PO_4)_3$ can be thought of as an intermediate to $Ba_3La(PO_4)_3$ and $Ba_4(PO_4)_2(SO_4)$. With the incorporation of hydrogen and the inherent rotation of the $PO_4$ groups, this compound is a preferred solid acid of the present invention.

In a further embodiment, the solid acids are compounds of the formula IIIa: $M^{2+}_4H_{(1+i+j)}(X^{+5}O_4)_{(3-i-j)}(X^{+4}O_4)_i(X^{+6}O_4)_j$, wherein $M^{2+}$ is a metal cation having a +2 charge, and each X is an element selected from the group consisting of P, Si, As, Ge, S, Se, W, Cr and V, having the labeled charge state. In addition, each of subscripts i and j is a non-negative real number.

In another embodiment, the solid acids are compounds of the formula IV: $M^{2+}_3M^{3+}H_j(XO_4)_{3-j}(X'O_4)_j$, wherein $M^{2+}$ is a metal cation having a +2 charge; $M^{3+}$ is a metal cation having a +3 charge; X is a member selected from the group consisting of P, V and As; and X' is a member selected from the group consisting of Si and Ge. For example, the compound $Ba_3BiH(PO_4)_2(SiO_4)$ is an intermediate compound between $Ba_3Bi(PO_4)_2(SiO_4)$ and $Bi_4(SiO_4)_3$. The reduced charge of the $SiO_4$ group (formally, +4 for Si) compared to a $PO_4$ group (formally, +5 for P) requires the incorporation of a proton for charge balance. The presence of protons attached to the rotationally disordered tetrahedra found in the eulytite structure of $Ba_3Bi(PO_4)_3$, results in superprotonic conduction of the protons through the crystalline structure of the compound.

In still another embodiment, the present invention provides compounds of the formula V: $M^{1+}_j M^{2+}_{3-j} M^{3+} H_j(XO_4)_3$, wherein $M^{1+}$ is a metal cation having a +1 charge; $M^{2+}$ is a metal cation having a +2 charge; and $M^{3+}$ is a metal cation having a +3 charge. For example, the compound $KBa_2BiH(PO_4)_3$ is an intermediate compound between $KBaBi_2(PO_4)_3$ and $Ba_3Bi(PO_4)_3$. Superprotonic conductivity arises due to the presence of protons attached to the rotationally disordered tetrahedral of the compound.

In a further embodiment, the present invention provides compounds of the formula Va: $M^{1+}_i M^{2+}_{(4-i-j)} M^{3+}_j H_{(1+j+k-l)} (X^{5+}O_4)_{(3-k-l)}(X^{+4}O_4)_k(X^{+6}O_4)_l$, wherein each M is a metal cation of the labeled charge state, and each X is an element selected from the group consisting of P, Si, As, Ge, S, Se, W, Cr and V, having the labeled charge state. In addition, each of subscript i, j, k and l are independently a non-negative real number.

In another embodiment, the present invention provides compounds of the formula VI: $M^{1+}_j M^{2+}_{(4n-1-j)} M^{(2+n)} H_j (XO_4)_{3n}$, wherein $M^{1+}$ is a metal cation having a +1 charge; $M^{2+}$ is a metal cation having a +2 charge; $M^{(2+n)}$ is a metal cation having a +3, +4 or +5 charge; and subscript n is a non-negative real number. For example, the compound $KBa_6ZrH(PO_4)_6$, because of the incorporation of hydrogen into the eulytite structure (with its inherent rotations of the $PO_4$ groups) is another preferred compound for expressing superprotonic conductivity.

In a further embodiment, the present invention provides compounds of Formula VIa: $M^{1+}_j M^{2+}_{(4n-1-j)} M^{(2+n)} H_{(j+k^*n-l^*n)}(X^{+4}O_4)_{(3-k-l)^*n}(X^{+4}O_4)_{k^*n}(X^{+6}O_4)_{l^*n}$, wherein each M is a metal cation of the labeled charge state, and each X is an element selected from the group consisting of P, Si, As, Ge, S, Se, W, Cr and V, having the labeled charge state. In addition, each of subscripts j, k, l and n are independently a non-negative real number.

In still other embodiments, the present invention provides compounds of formula VII: $M^{2+}_{(4n-1)} M^{(2+n-j)} H_j(XO_4)_{3n}$, wherein $M^{2+}$ is a metal cation having a +2 charge; $M^{(2+n-j)}$ is a—metal cation having a +3, +4 or +5 charge; and subscript n is a non-negative real number. For example, the known compound $Ba_7Sn^{+4}(PO_4)_6$ can have the $Sn^{+4}$ atoms reduced, in the presence of a hydrogen containing atmosphere, to $Sn^{+2}$ atoms. Hydrogen is then simultaneously incorporated in to the eulytite structure (creating $Ba_7Sn^{+2}H_2(PO_4)_6$) for charge balance. The combination of the inherent rotations of the $PO_4$ groups in this eulytite structure and the presence of acid protons effectuate superprotonic conductivity.

In further embodiments, the present invention provides compounds of Formula VIIa: $M^{2+}_{(4n-1)} M^{(2+n+j)} H_{(j+k^*n-l^*n)}(X^{+5}O_4)_{(3-k-l)^*n}(X^{+4}O_4)_{k^*n}(X^{+6}O_4)_{l^*n}$, wherein each M is a metal—cation of the labeled charge state, and each X is an element selected from the group consisting of P, Si, As, Ge, S, Se, W, Cr and V, having the labeled charge state. In addition, each of subscripts j, k, l and n are independently a non-negative real number.

In yet another embodiment, the solid acid is selected from the group consisting of $M^{2+}_4H(NO_4)_3$, $M^{2+}_3M^{3+}H_j(XO_4)_{3-j}(X'O_4)_j$, $M^{1+}_j M^{2+}_{3-j} M^{3+} H_j(XO_4)_3$, $M^{1+}_j M^{2+}_{(4n-1-j)} M^{(2+n)} H_j(XO_4)_{3n}$ and $M^{2+}_{(4n-1)} M^{(2+n-j)} H_j(XO_4)_{3n}$, wherein $M^{1+}$ is a metal cation having a +1 charge; $M^{2+}$ is a metal cation having a +2 charge; $M^{3+}$ is a metal cation having a +3 charge; $M^{(2+n)}$ is a metal cation having a +3, +4 or +5 charge; $M^{(2+n-j)}$ a metal cation having a +3, +4 or +5 charge; and subscripts j and n are each independently a non-negative real number.

Furthermore, any combination of the above examples have superprotonic conductivity over a large temperature range and are stable in a liquid water environment. In the eulytite structures listed above, a 4:3 of cation to anion ratio (corresponding to $M_4(XO_4)_3$, i.e., the general formula) is maintained, while the hydrogen atoms are incorporated into the structure for charge neutrality. In general, as long as the 4:3 metal cation to anion ratio of the eulytite structure is maintained, the incorporation of the appropriate amount of protons into the structure is possible. Therefore, the most general formula for superprotonic solid acid eulytites simply maintains an overall ratio of 4:3 for the number of metal cations to number of anions in the structure, regardless of the exact stoichiometry, with some amount of stoichiometric hydrogen incorporated into the crystal structure. This generalization also applies to non-homogenous tetrahedral anions such as $PO_3F$, $PO_3H$, $AsO_3F$, $SiO_3F$, and the like, as well as non-tetrahedral anions that might be in the eulytite structure (such as $I^{-1}$ in the compound $Pb_8(PO_4)_5I$). Moreover, the cations need not to be individual atoms such as K, Ba, or Bi, but can equally be $NH_4^+$ or other small molecules. As long as the eulytite structure is maintained (with the inherent rotations of the oxyanions) and protons are incorporated into the crystalline structure, all such compounds exhibit superprotonic conductivity.

Some solid acids can be prepared by contacting a metal, a carbonate salt, a metal oxide or a metal hydroxide with a predetermined amount of an acid in an aqueous solution, then evaporating the solvent. For example, $CsH_2PO_4$ can be prepared by reacting one equiv. of $Cs_2CO_3$ with one equiv. of $H_3PO_4$. Similarly, $CsHSO_4$ can be prepared by reacting one equiv. of $Cs_2CO_3$ with one equiv. of $H_2SO_4$. Synthesis routes to superprotonic solid acids, such as eulytite solid acids include, but are not limited to: hydrothermal methods, melt processing, high pressure/temperature methods, single crystal growth from phosphate and silicate gels, ion exchange procedures, and solid state synthesis followed by reduction/incorporation of hydrogen. Various methods for preparing solid acids are described in the U.S. Pat. No. 6,468,684 and US Patent Application Ser. No. 2006/0020070 incorporated herein by reference.

The secondary component in the solid acid composite can be an organic compound, an organometallic compound, an inorganic compound, a ceramic, a nanostructure, a metal or a polymer. Preferably, the secondary component has a plurality of surface hydrogens and is capable of forming hydrogen bonds with the solid acids. For example, suitable secondary component includes, but is not limited to, an inorganic compound, a ceramic material, a nanostructure and a polymer, each of the compounds, material structures or polymers having hydrogen bond donors and/or acceptors on the respective surfaces.

The present invention contemplates that the surface hydrogen of the secondary compounds can interact with solid acids through hydrogen bonding, dipolar interactions, van der Waals interactions or combinations of interactions. Preferably, the surface hydrogen of the secondary component interact with the surface of the solid acid compounds, for example, through hydrogen bonding, to form a plurality of interfaces that are favorable with respect to high protonic conductivities and stabilities. For example, the secondary component can interact with the solid acid to form a hydrogen bonded network at the interfaces leading to increased resistance for mechanical creep and high conductivity for solid acid.

In some embodiments, the secondary component is an inorganic compound. Many types of inorganic compounds have hydrogen atoms on their surfaces. In general, these compounds can be classified into four groups: 1) crystallographic hydrates, where the water is incorporated into the crystal structure (e.g., $Na_2H_2SiO_4*3H_2O$, $Sr_3(PO_4)_2*4H_2O$, $BaHAsa_4*H_2O$, $Ca_8(HPO_4)_2(PO_4)_4*5H_2O$, etc. see, Schmid, R. L. et al. *Acta Cryst.* 1985, C41, 638-641; Collin, R. L. *J. Chem. and Eng. Data* 1964, 9(2), 165-66; Nabar, M. A. et al. *Monatshefte Fur Chem.* 1978, 109, 673-79; Mathew, M. et al. *J. Cryst and Spec. Res.* 1988, 18(3), 235-50), 2) hydroxide compounds, where crystallographic hydroxide ions ($OH^-$) are situated in the compounds structure (e.g., $Ba_5(PO_4)_3OH$, $Ca(HSiO_4)OH$, etc., see, Bondareva, O. S. et al. *Kristallografiya* 1986, 31, 233-36; Marsh, R. E. *Acta Crystallographica* 1994, C50, 996-7), 3) solid acids (see, U.S. patent application Ser. No. 09/439,377, incorporated herein by reference), where acidic protons are found crystallographically positioned on oxyanions ($CsHSO_4$, $CsHPO_4$, $K_3H(SO_4)_2$, etc., see, Chisholm, C. R. I. et al. *Solid State Ionics* 2001, 145, 179-84; Chisholm, C. R. I. et al. *Mater. Res. Bull.* 2000, 35, 999-1005), and 4) compounds with hydrogen containing species chem-absorbed to their surfaces (e.g., $SiO_2*xH_2O$, $LaPO_4*xH_2O$, $LaPO_4*xH_2O(H_3PO_4)_n$, $CePO_4*xH_2O$ $(H_3PO_4)_n$, etc., see, Lucas, S. et al. *J. Solid State Chem.* 2004, 177, 1302-11; Lucas, S. et al. *J. of Solid State Chem.* 2004, 177, 1312-20), or structural cavities (e.g., zeolite water, see, Donaldson, J. D. et al. *J. Inorganic and Nuclear Chem.* 1967, 25, 1239).

In one embodiment, the secondary component is an inorganic compound of the formula VIII: $M'_d(X'O_y)_e*nH_2O(H_fX''O_z)_g$, where M' is a cation having a charge from +1 to +7; preferably from +1 to +4; more preferably, from +1 to +3. X' and X'' are each independently an element that can form oxyanions. Subscripts n and g are non-negative real numbers with the proviso that n and g are not both equal to zero at the same time, for example, if n=0, then g≠0 and vice versa. Subscripts d, e, f, y and z are each independently a non-negative real number, preferably from 1 to 15, more preferably from 1 to 9, and even more preferably from 1 to 4, such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0. In some embodiments, M' can be a metal cation selected from the group consisting of alkali and alkaline metals, such as $Li^+$, $Be^{2+}$, $Na^+$, $Mg^{2+}$, $K^+$, $Ca^{2+}$, $Rb^+$, $Sr^{2+}$, $Cs^+$, $Ba^{2+}$; transition metals, such as, $Sc^{3+}$, $V^{3+}$, $V^{5+}$, $Cr^{3+}$, $Cr^{5+}$, $Ni^{2+}$, $Cu^+$, $Zn^{2+}$, $Y^{3+}$, $Nb^{3+}$, $Mo^{3+}$, $Mo^{6+}$, $Ta^{3+}$, $Ta^{5+}$, $W^{3+}$, $W^{6+}$, $Ru^{2+}$, $Rh^{2+}$, $Rh^{3+}$, $Pd^{2+}$, $Pd^{4+}$, $Ag^+$, $Cd^{2+}$, $Cd^{3+}$, $Ir^{3+}$, $Pt^{2+}$, $Pt^{4+}$, $Au^+$, $Au^{3+}$ and $Hg^+$ and $Hg^{2+}$; the lanthanides, such as $La^{3+}$, $Ce^{3+}$, $Pr^{3+}$, $Nd^{3+}$, $Pm^{3+}$, $Sm^{3+}$, $Eu^{3+}$, $Dg^{3+}$, $Tb^{3+}$, $Dy^{3+}$, $Ho^{3+}$, $Er^{3+}$, $Tm^{3+}$, $Yb^{3+}$ and $Lu^{3+}$; post-transition metals, such as $Al^{3+}$, $Ca^{3+}$, $In^{3+}$, $In^{3+}$, $Tl^+$, $Tl^{3+}$, $Ge^{2+}$, $Sb^{3+}$, $Bi^{3+}$, $Sn^{2+}$, $Pb^{2+}$; and mixtures thereof. Preferably, M' is a metal cation selected from the group consisting of $Li^+$, $Be^{2+}$, $Na^+$, $Mg^{2+}$, $K^+$, $Ca^{2+}$, $Rb^+$, $Sr^{2+}$, $Cs^+$, $Ba^{2+}$, $Mn^{2+}$, $Fe^{2+}$, $Co^+$, $Co^{2+}$, $Ni^{2+}$, $Cu^+$, $Cu^{2+}$, $Zn^{2+}$, $Ru_{2+}$, $Rh^{2+}$, $Pd^{2+}$, $Ag^+$, $Cd^{2+}$, $Pt^{2+}$, $Au^+$, $Hg^+$, $Hg^{2+}$, $In^+$, $Tl^+$, $Ge^{2+}$, $Sn^{2+}$, $Pb^{2+}$ and mixtures thereof. More preferably, M' is a metal cation including, but not limiting to, $Li^+$, $Be^{2+}$, $Na^+$, $Mg^{2+}$, $K^+$, $Ca^{2+}$, $Rb^+$, $Sr^{2+}$, Cs$^+$, Ba$^{2+}$ and mixtures thereof. Alternatively, M' is a non-metal cation, including, but not limiting to, NH$_4^+$, pyridinium (Merker, V. L. et al. *Zeitschrift Fur Kristallographie* 1967, 125, 266-271).

TABLE 1

List of some known eulytite compounds grouped by general formula

| M$^{+3}_4$(XO$_4$)$_3$ | M$^{+2}_3$M$^{+3}$(XO$_4$)$_3$ | M$^{+1}_j$M$^{+2}_{3-j}$M$^{+3}_{1+j}$(XO$_4$)$_3$ | M$^{+2}_4$(XO$_4$)$_2$(X'O$_4$) | M$^{+2}_{4n-1}$M$^{+(2+n)}$(XO$_4$)$_{3n}$ |
|---|---|---|---|---|
| Bi$_4$(SiO$_4$)$_3$ | Ba$_3$La(PO$_4$)$_3$ | KBaBi$_2$(PO$_4$)$_3$ | Pb$_4$(PO$_4$)$_2$(SO$_4$) | Ba$_7$Zr(PO$_4$)$_6$ |
| Bi$_4$(GeO$_4$)$_3$ | Ba$_3$Bi(PO$_4$)$_3$ | K$_3$Bi$_5$(PO$_4$)6 | Pb$_4$(PO$_4$)$_2$(CrO$_4$) | Pb$_7$Sn(PO$_4$)$_6$ |
|  | Sr$_3$La(PO$_4$)$_3$ | RbBaBi$_2$(PO$_4$)$_3$ | Ba$_4$(PO$_4$)$_2$(SO$_4$) | Sr$_7$Ti(PO$_4$)$_6$ |
|  | Ca$_3$La(PO$_4$)$_3$ | AgPbBi$_2$(PO$_4$)$_3$ | Sr$_4$(PO$_4$)$_2$(SO$_4$) | Ba$_{11}$Ta(PO$_4$)$_9$ | ion, pyrrolium ion, imidazolium ion, (R$^1$)NH$_3^+$, (R$^1$)(R$^2$)NH$_2^+$ and (R$^1$)(R$^2$)(R$^3$)NH$^+$, where R', R$^2$ and R$^3$ are each independently alkyl, C$_{3-12}$cycloalkyl, arylalkyl, heteroalkyl, aryl and heteroaryl. Alkyl groups include linear alkyl or branched alkyl, preferably C$_{1-6}$alkyl. Cycloalkyl groups include monocyclic, bicyclic, tricyclic and spiro alkyls. Aryl groups include C$_{6-12}$aryl and fused aromatic compounds. Heteroalkyl groups refer to alkyl groups containing at least one heteroatom selected from O, N and S. Preferred heteroalkyls are C$_{1-6}$heteroalkyls. Heteroaryl groups refer to aryl groups that contain from one to five heteroatoms selected from N, O, and S. Examples of ammonium ions include, but are not limited to, (C$_2$H$_5$)$_2$NH$_2^+$, CH$_3$NH$_3^+$, (CH$_3$)$_2$NH$_2^+$, (CH$_3$)$_3$NH$^+$, C$_5$H$_6$N$^+$ (pyridinium ion), C$_4$H$_5$N$^+$ (pyrrolium ion), C$_3$H$_5$N$_2^+$ (imidazolium ion) and C$_3$H$_{40}$N$^+$ (oxazolium ion). In certain embodiments, X' and X" are each independently an element selected from the group consisting of S, Se, P, As, Si, Ge, V, Cr, W and Mn. Exemplary secondary component inorganic compounds include SiO$_2$*xH$_2$O, LaPO$_4$*xH$_2$O, LaPO$_4$*xH$_2$O(H$_3$PO$_4$)$_n$, CePO$_4$*xH$_2$O(H$_3$PO$_4$)$_n$, PrPO$_4$*xH$_2$O(H$_3$PO$_4$)$_n$, NdPO$_4$*xH$_2$O(H$_3$PO$_4$)$_n$, PmPO$_4$*xH$_2$O(H$_3$PO$_4$)$_n$, SmPO$_4$*xH$_2$O(H$_3$PO$_4$)$_n$, EuPO$_4$*xH$_2$O(H$_3$PO$_4$)$_n$, GdPO$_4$*xH$_2$O(H$_3$PO$_4$)$_n$, TbPO$_4$*xH$_2$O(H$_3$PO$_4$)$_n$, DyPO$_4$*xH$_2$O(H$_3$PO$_4$)$_n$, HoPO$_4$*xH$_2$O(H$_3$PO$_4$)$_n$, ErPO$_4$*xH$_2$O(H$_3$PO$_4$)$_n$, TmPO$_4$*xH$_2$O(H$_3$PO$_4$)$_n$, YbPO$_4$*xH$_2$O(H$_3$PO$_4$)$_n$, LuPO$_4$*xH$_2$O(H$_3$PO$_4$)$_n$, BaSO$_4$*xH$_2$O, Al$_2$O$_3$*xH$_2$O, TiO$_2$*xH$_2$O, Zr(SO$_4$)$_2$*nH$_2$O.

The secondary component of the formula VIII has surface hydrogens resulting from the bonded H$_2$O and/or acid, H$_f$X"O$_z$. The compound is capable of forming a hydrogen bond network with the solid acid component resulting in a solid acid composite with increased thermal stability, improved mechanical properties, and high proton conductivity.

In other embodiments, the secondary component can be an inorganic eulytite compound. Known eulytite compounds have the general formula M$_4$(XO$_4$)$_3$ (M=Na, K, Rb, Ag, Ba, Sr, Ca, La, Ce, Pr, Bi, Pb, and the like; X=Si, Ge, P, As, V, S, Se, Cr) and cubic space group I$\bar{4}$ 3d. A list of some known eulytite compounds can be found in Table 1. In addition to the types of compounds listed in Table 1, there is evidence of significant solubilities of the different compounds with each other and hence, a large number of intermediate compounds can be synthesized (Perret, R. et al. *Journal of the Less Common Metals* 1985, 108, 23-34; Kargin, Y. F. et al. *Neorganicheskie Materialy* 1991, 27(3), 563-565; Elouadi, B.; et al. *Phase Transitions* 1988, 13, 211-218). In some cases, it has even been reported that the XO$_4$ groups can be replaced by other large anions, such as I$^{-1}$ in the compound Pb$_8$(PO$_4$)$_5$I The secondary inorganic compounds can be prepared by contacting a metal, a metal oxide, a metal hydroxide or a metal carbonate with a predetermined amount of acid in an aqueous solution; a protic organic solvent, such as an alcohol; a polar aprotic organic solvent, such as an amide or a sufoxide; or a mixed aqueous-organic solution. Preferably, the reaction is conducted in an aqueous environment. For example, La(PO$_4$) can be prepared by reacting of La$_2$O$_3$ with a stoichiometric amount of H$_3$PO$_4$ in water.

In one embodiment, the secondary component can be an eulytite compound having a formula selected from the group consisting of M$^{+3}_4$(XO$_4$)$_3$*nH$_2$O(H$_f$X'O$_z$)$_g$, M$^{+2}_3$M$^{+3}$(XO$_4$)$_3$*nH$_2$OH$_f$X'O$_z$)$_g$, M$^{+1}_j$M$^{+2}_{3-j}$M$^{+3}_{1+j}$(XO$_4$)$_3$*nH$_2$O(H$_f$X'O$_z$)$_g$, M$^{+2}_4$(XO$_4$)$_2$(X'O$_4$)*nH$_2$O(H$_f$X"O$_z$)$_g$ and M$^{+2}_{4n-1}$M$^{+(2+n)}$(XO$_4$)$_{3n}$*nH$_2$O(H$_f$X'O$_z$)$_g$, where M is a metal as defined above and having the stated charge; X and X' are each independently an element selected from the group consisting of S, Se, P, As, Si, Ge, V, Cr, W and Mn. Subscripts j, f, z, g and n are as defined above. Subscripts n and g are non-negative real numbers with the proviso that n and g are not both equal to zero at the same time, for example, if n=0, then g≠0 and vice versus.

In some embodiments, the secondary component itself can be a composite material, such as ceramics having hydrogen bond donors and/or hydrogen bond acceptors molecules attached to the surfaces to provide hydrogen bonding active surface hydrogens. Example of such composite materials include, but are not limited to ceramics, metals and glass. Preferred ceramic material includes, for example, silicon carbide (SiC), Si$_3$N$_4$, LaPO$_4$, YPO$_4$, AlPO$_4$, CePO$_4$, ZrO$_2$, TiO$_2$, BaZrO$_3$, BaTiO$_3$ or Y$_2$O$_3$. Preferred metals include gold, silver, platinum, cobalt, nickel and palladium. In one embodiment, the surface of SiC can contain a functional group, such as —OH, —NH$_2$, NH$_2$C(O)—, —COOH, —Si—H; or a molecule, such as NH$_3$ or H$_2$O. For example, the SiC can contain silanol groups, eg., Si—OH, absorbed hydrogen atoms (Si/C—H), water molecules (Si/C—OH$_2$) or ammonia (Si/C—NH$_3$). The surface of the ceramic materials can be modified through physical or chemical absorption by contacting the surface with the appropriate chemicals, including H$_2$O, NH$_3$, alcohols, amide, thiols, hydroxides or acids at ambient to elevated temperatures. In one embodiment, the absorption reaction is carried out in solution, such as an aqueous solution. The acids used for absorption on the surface can be inorganic acids, such as HNO$_3$, H$_2$SO$_4$, H$_3$PO$_4$, hydrogen halide, H$_3$BO$_3$, H$_2$SeO$_4$ and H$_2$WO$_4$; and organic acids, such as carboxylic acids. A person of skill in the art will appreciate that other chemicals and acids can also be used. Techniques of self-assembly of molecules on the surface can also be used to prepare modified surfaces (see, Whitesides, G. M. et al. *Science* 2002, 295, 2418-2421; Birdi, K. S. Self-Assembly Monolayer Structures of Lipids and Macromolecules at Interfaces; Springer, 1st Ed. 1999). The chemicals used to modify the surface structure can be in either gas, liquid or solution phase. The absorbed species can remain stable on the surface at high temperatures (e.g. ~300° C.) for an extended period of time as a result of the formation of dative bonds between the donor molecules and the surface. Examples of stabilizing interactions of the absorbed species, such as $NH_3$, water and hydroxyl ion on the SiC surface are shown below.

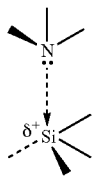

1a

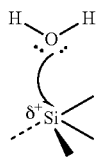

1b

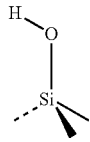

1c

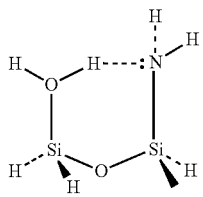

1d

In certain other embodiments, the secondary component can be hompolymers, copolymers or polymer blends having hydrogen bond donor and/or acceptors attached to the polymers, preferably having a plurality of surface hydrogen suitable for hydrogen bonding. Suitable polymers can contain acid and/or base functionalities. Examples of polymers include, but are not limited to, polyimides; polyimidazoles, such as polybenzimidazoles, poly(2-hydroxybenzimidazole), poly(benzimidazole-5-carboxylic acid) and poly(2-nonyl benimidazole); poly(trimesic acid)s; polyamic acids; polyamic acids/polyimides; polyamines, polyamides, such as polyphthalamide; poly(monododecylphosphate); poly(dihexadadecyl phosphate), poly(phenyl phosphoric acid); polyaniline; a phosphated tetrafluoroethylene copolymer; and Nafion®, a sulfonated tetrafluorethylene copolymer manufactured by Dupont de Nemours chemical company. In one embodiment, the polymers have a cross-linked structure with surface hydrogens. The cross-linked polymers can be synthesized by homopolymerizing a multifunctional monomer or copolymerizing at least two multifunctional monomers. The monomers used for preparing cross-linked polymers typically have at least two reactive functional groups. An example of such a monomer is trimesic acid having the formula: $C_6H_3(COOH)_3$ with three carboxylic acid groups at 1, 3 and 5 positions of the benzene ring. The compound is a crystalline powder and has a melting temperature about ~375° C., and is used as a plasticizer to engineer the mechanical properties, epoxy resins and synthetic fibers. A composite membrane of a solid acid and trimesic acid can be formed by grinding the two compounds together and then mechanically compressing the mixture into the desired membrane shape. The trimesic acid can then be cross-linked to itself by heating at 250° C., forming a polymer support structure in the composite membrane. The hydrogens on the carboxylic groups can then interact with the non-bonded oxygens of the solid acid, while the hydrogens of the solid acid can form bonds with the double bonded carbonyl oxygens of the carboxylic groups and the residues of the hydroxyl groups of the carboxylic acids. The interaction of the solid acids and the polymer particles result in hydrogen bonds of medium strength being formed between the solid acid and polymer particles. These bonds are formed at random, greatly enhancing the protonic conductivity at the solid acid/polymer interface. At the same time, the medium strength bonds mechanically strengthen the interaction between the solid acid and polymer, thus transferring the mechanical properties of the polymer to the solid acid.

In yet another embodiment, the secondary component is a polyimidazole, such as polybenzimidazole (PBI), which can be mixed and made into a proton conducting electrolyte membrane with properties well suited for applications such as fuel cells, hydrogen separation membranes, electrolyzers, electrochromic displays, supercapacitors, and gas sensors ($H_2$, CO, etc.). Although it is known in the art that PBI can be used in conjunction with corrosive phosphoric acid for proton conduction, solid acid/PBI proton conducting composite membranes have many advantages. First, solid acids have vapor pressures, which are several orders of magnitude lower than phosphoric acid, so that expensive graphitization of application parts is not necessary. Second, solid acid electrolytes do not solubilize noble metal catalysts, allowing the use of much smaller catalyst particles (i.e., high catalyst surface area) and hence, lower catalyst loadings and MEA cost. Finally, the mechanical, chemical and thermal stabilities of PBI are a nearly ideal match for use with solid acid membranes operating in the range 200-300° C. For example, the material maintains its polymer-like properties (e.g., compressive/tensile strengths and Poisson's ratio) up to ~540° C. and is highly resistant to both oxidation and reduction even at temperatures above 400° C. PBI can be synthesized by polymerization of 3,3'-diaminobenzidine and diphenyl isophthalate (see, Buckley, A. et al. Polybenzimidazoles" p 572-601 in *Encyclopedia of Polymer Science and Engineering*. Vol 11; Wiley, New York, 1988; Marvel. C. S. J. *Macromol. Sci. Rev. Macromol. Chem.* 1975, C13, 219; Ueda, M. et al. *Macromolecules*, 1985, 18, 2723). PBI and the eulytite acid can also interact to form hydrogen bonds of medium strength leading to composite with improved mechanical property, thermal stability and high protonic conductivity.

In still another embodiment, the secondary component can be an ionomer, for example, a sulfonated tetrafluoroethylene copolymer, such as Nafion® (tetrafluoroethylene-perfluoro-3,6-dioxa-4-methyl-7-octenesulfonic acid copolymer) having the formula:

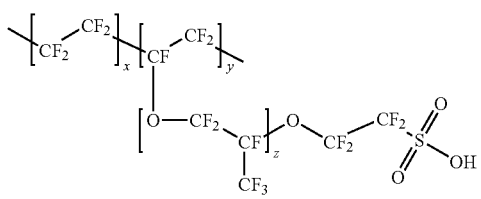

These unique polymers have ionic properties as a result of incorporating perfluorovinyl ether groups terminated with sulfonate groups onto a polytetrafluoroethylene (e.g., Teflon) backbone. Nafion has excellent thermal (>300° C.) and mechanical stability, and resistance to chemical attack. Nafion can be cast into thin films by heating in aqueous alcohol at 250° C. Nafion derivatives are first synthesized by the copolymerization of tetrafluoroethylene and a derivative of a perfluoro(alkyl vinyl ether) with sulfonyl acid fluoride. The latter reagent can be prepared by the pyrolysis of its respective oxide or carboxylic acid to the olefinated. The resulting product is an —$SO_2F$ thermoplastic that is extruded into films of required thickness. This form of Nafion, referred to as the neutral or salt form, is chemically activated by hydrolysis by soaking the film in aqueous acid solution; this process gives the superacid —$SO_3H$ form (see, Mauritz, K. A. et al. "State of Understanding of Nafion" *Chem. Rev.* 2004, 104: 4535-4585; and U.S. Pat. No. 3,282,875 incorporated herein by reference). One of skill in the art will appreciate that other copolymer, such as a phosphated tetrafluoroethylene copolymer can be prepared using the similar methods. The interaction of the acidic $SO_3H$, sulfite groups with the oxyanion groups of the solid acid, such as phosphate groups of $CsH_2PO_4$ results in a disordered hydrogen bonded network that simultaneously bonds the solid acid to the polymer matrix and also leads to high protonic conductivity at the interface.

In another embodiment, the secondary component can be polyimide, polyamic acid or a mixture of polyamic acid and polyimide. Polyimide can be synthesized by dehydration of polyamic acid as shown below:

Polyimide has oxygen and nitrogen atoms, which can interact with the hydrogen, such as surface hydrogen of the solid acid to form hydrogen bonds interfaces, which can also lead to high proton conductivity.

In a further embodiment, the secondary component can be a nanostructure. Suitable nanostructures include, but are not limited to, functionalized carbon nanotubes and functionalized fullerenes. Both single-wall and multi-wall nanotubes can be used. A person of skill in the art will appreciate that other functionalized nano materials can also be used. In general, the nanostructure are functionalized with functional groups that can form hydrogen bonds with the solid acids. Suitable functional groups include, but are not limited to, OH, —$NH_2$, $NH_2C(O)$—, —COOH and —SH. Functionalized carbon nanostructures can be prepared according to the process known in the art (see, Smalley, R. E. et al. *Carbon Nanotubes: Synthesis, Structure, Properties and Applications*, Springer; 1st Ed, 2001; Ajayan, Z. P. et al. "Making Functional Materials with Nanotubes" *Material Res. Soc. Sym. Proc.* 2002, V. 706; Geckeler, K. E. *Functional Nanomaterials*; American Scientific Publishers, 2006).

The solid acid composite materials also have interfaces with increased structural disorder compared to bulk solid acids, such that increased resistance to mechanical creep, improved thermal stability and enhanced proton conductivity are observed. The interfaces are formed by interactions between the solid acid component and the secondary component. The interfaces can be formed through hydrogen bonding, dipolar interaction, van der Waals interactions or combinations of forces. Preferably, the interfaces are formed through hydrogen bonding interactions. Hydrogen bond donors are surface hydrogens and hydrogen bond acceptors are molecules or structures with atoms having lone-pair electrons. Examples of atoms suitable for hydrogen bonding include, but are not limited to, N, O, S or halogens, for example, F, Cl, and Br. The solid acids can be both hydrogen bonding donors and acceptors. The secondary component can be hydrogen bond donors and/or acceptors. In one embodiment, the interfaces are formed by hydrogen bonding interactions between the hydrogen bond donors, such as surface

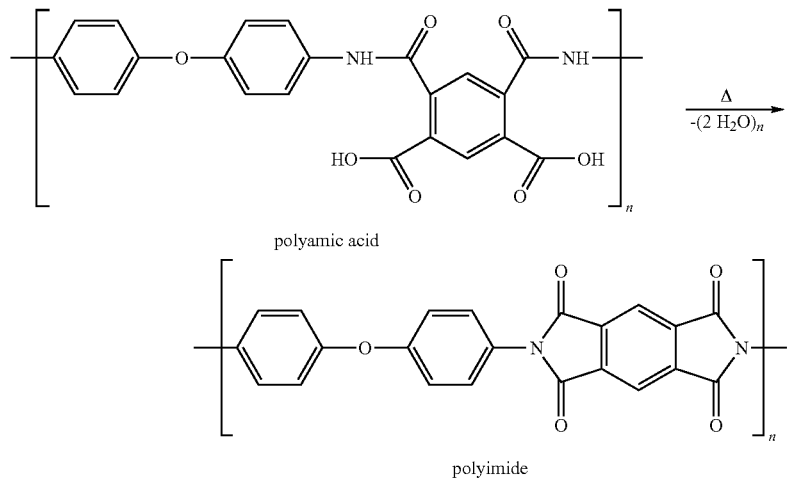

Polyamic acid has both hydrogen bond donors and acceptors, which can interact with solid acid, such as $CsH_2PO_4$ to form composite materials having disordered hydrogen bonded network at the interface leading to high proton conductivity.

hydrogens and acceptors of the solid acids and the hydrogen bond donor and acceptors of the secondary component. For example, the hydrogen bond donors of the secondary component are surface hydrogens. In another embodiment, the interfaces are formed by hydrogen bonding interactions between the hydrogen bond donors and acceptors of the solid acids and the surface hydrogens of the secondary component. The interfaces are formed such that they can provide high protonic conductivity, mechanically stabilizing solid acid electrolyte membranes with respect to thermal creep, and kinetically stabilizing the surfaces of solid acids with respect to dehydration. The dimension of the interfaces can be controlled by using different solid acids, different secondary components or by alteration of the size of the solid acid particles and/or secondary component particles. In some embodiments, the interfaces formed have a dimension ranging from about 5 nm to about 5 µm. The dimension of the interfaces is determined from the average distance of the particles in the composite.

The interfaces can be formed by a solid acid and a secondary component selected from the group consisting of an inorganic compound, a polymer, a nanostructure, a metal, glass and ceramic material. The solid acid can be a compound with the formulas I, Ia, Ib, II, IIa, III, IIIa, IV, V, VI, VIa, VII, VIIa or combinations of the foregoing. In some embodiments, the interfaces are formed between the solid acids and inorganic compounds, such as a compound having the formula VIII: $M'_d(XO_y)_e*nH_2O(H_fX''O_z)_g$ as described above. In certain other embodiments, the interfaces are formed by solid acids and an eulytite compound having the formula: $M^{+3}{}_4(XO_4)_3*nH_2O(H_fX'O_z)_g$, where the M is a metal selected from the group consisting of Na, K, Rb, Ag, Ba, Sr, Ca, La, Ce, Pr, Nd, Pm, Sm, Eu, Dg, Tb, Dy, Ho, Er, Tm, Yb, Lu, Bi, Pb; X and X and X' are each independently an element selected from the group consisting of Si, Ge, P, As, V, S, Se, Cr, Mn and W; and subscripts d, y, e, n, f, g, z are non-negative real numbers. Subscripts n and g are not both equal to zero at the same time, for example, if n=0, then g≠0 and vice versa. The interfaces are comprised of hydrogen bond network formed through hydrogen bonding interactions between the solid acids and the secondary compounds.

In another embodiment, interfaces are formed by solid acids and ceramics with modified surface structure, which are suitable for hydrogen bonding, Examples of ceramics include, for example SiC with hydrogen bonding donor molecules attached to the surface. In yet another embodiment, interfaces are formed by solid acids and polymers having surface hydrogens, which are suitable for hydrogen bonding. Polymers with surface hydrogens include, but are not limited to, PBI, poly(trimesic acid), polyimide, polyamide, polyamine and Nafion. In still other embodiments, interfaces are formed by solid acids and functionalized nanostructures. Exemplary functionalized nanostructures include, but are not limited to, hydroxyl or amino functionalized carbon nanotubes. The hydrogen bonds form a disordered hydrogen boned network at the interface leading to increased resistance to mechanical creep for the solid acid component, At the same time, the disordered hydrogen boned network of the interface results in high conductivity.

The solid acid composite material can be prepared by mixing solid acids, such as solid acid particles with a secondary component, such as secondary component particles. The solid acid and the secondary component are interconnected through interfaces formed by hydrogen bonding interactions, dipolar interactions, van der Waals interactions or combinations of different interactions. The composite materials can be either crystalline, amorphous or have a mixed morphology. The dimension of the solid acid particles and secondary component particles can be in the ranges of about 1 nm to about 25 µm. Exemplary particle dimensions of the composite material are from about 1 nm to about 200 µm, 100 nm to about 500 nm, from about 300 nm to about 1 µm, from about 800 nm to about 5 µm, from about 900 nm to about 8 µm, from about 300 nm to about 5 µm, from about 500 nm to about 10 µm, from about 5 µm to about 20 µm and from about 15 µm to about 25 µm. One of skill in the art recognizes that the composite materials can have other particle sizes. The dimension of the solid acid composite particles can be in the range from nanometers to micrometers, for example, from about 5 nm to about 50 µm. The particles can adopt various symmetrical, unsymmetrical or irregular shapes. Examples of regular particle shapes include, but are not limited to, spherical, oval, cubical, cylindrical, polyhedral or combinations thereof. The solid acid composite particles can have a regular arrangement or a random distribution depending on the solid acid and the secondary component used, which have allowed the fine tuning of the structure and properties of the interfaces formed.

Various methods are available for the preparation of the composite material. In one embodiment, the composite material can be prepared by mechanically grinding the two components together in a predetermined ratio to achieve intimate mixture. For example, $CsH_2PO_4/LaPO_4*nH_2O(HPO_4)_g$ can be prepared by mechanically grinding solid acid $CsH_2PO_4$ with secondary compound $LaPO_4*nH_2O(HPO_4)_g$. For example, the solid acid composite can be prepared by mixing a 1:1 molar ratio of $CsH_2PO_4$ and $LaPO_4*nH_2O(HPO_4)_g$ at temperatures from about 23° C. to about 300° C. in ambient pressure. In another embodiment, the solid acid composite material can be prepared by co-precipitation from a solution. For example, a composite of $CsH_2PO_4$ and Nafion can be formed by co-precipitation from an aqueous solution at about 60° C. A thin film composite useful as a fuel cell membrane is prepared by casting a thin layer of the material in an aqueous solution over a flat surface, such as glass dish. In yet another embodiment, the composite can be prepared by melt-processing. For example, the solid acid can be melt-processed onto a preformed membrane containing a secondary component.

Figure 2:
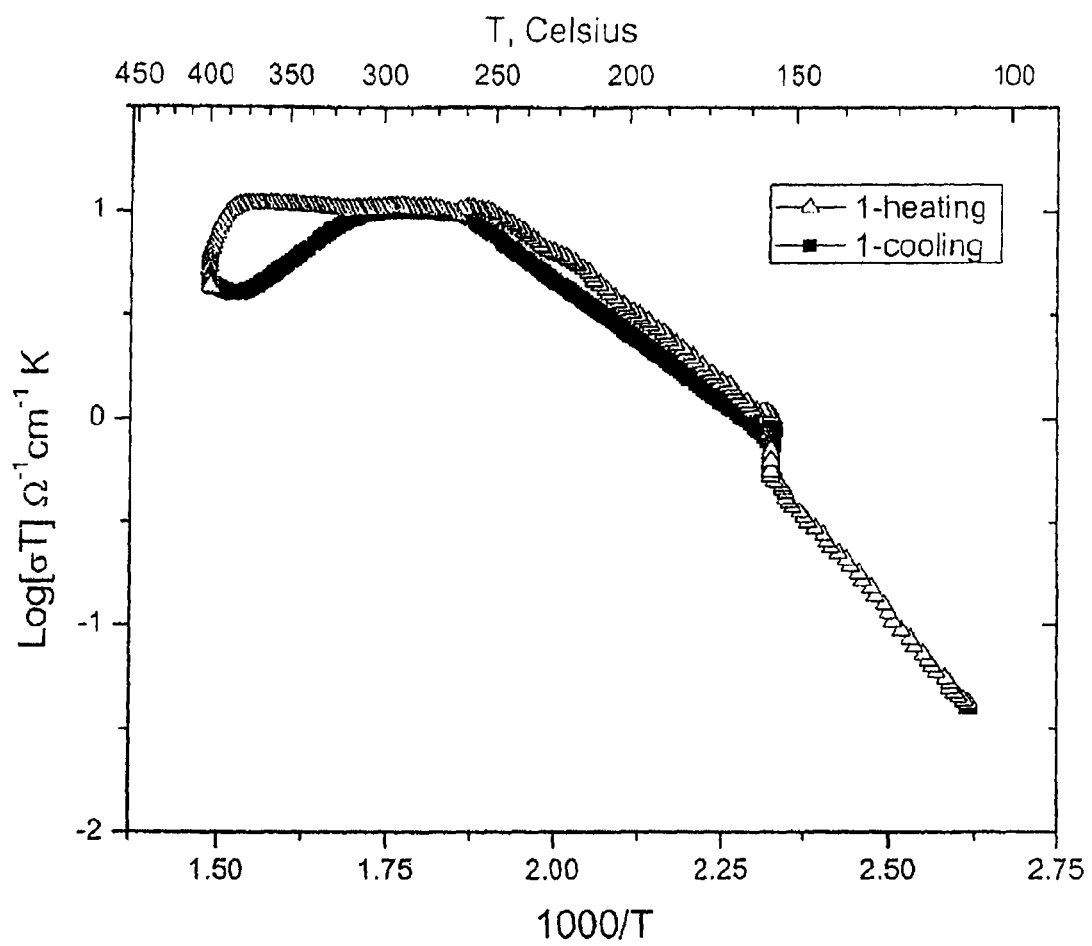
FIG. 2 illustrates the ability of the $CsH_2PO_4/LaPO_4*nH_2O(H_3PO_4)_g$ composite to rehydrate below ~300° C. The conductivity of the composite can be measured up to 400° C. All measurements were taken with heating/cooling rates of 1° C./min, under flowing air atmospheres with a partial pressure ~0.7 atm.
Figure 3:
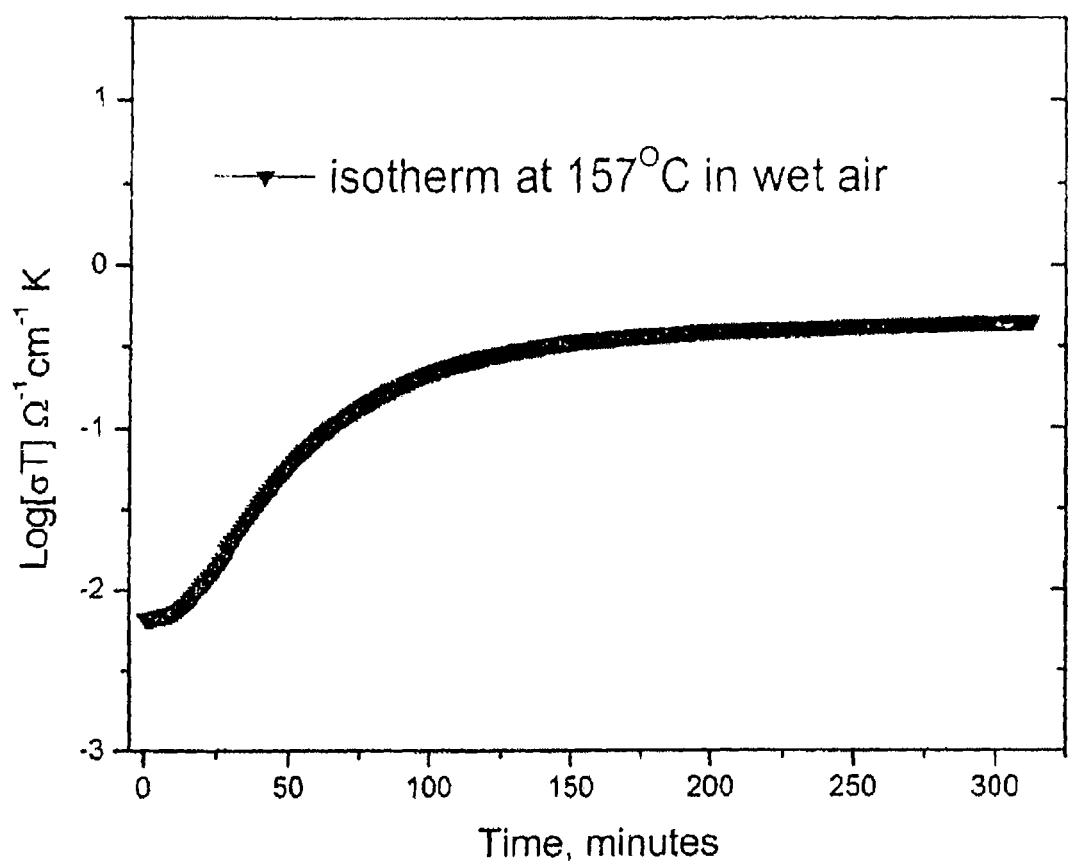
FIG. 3 illustrates the ability of the $CsH_2PO_4/LaPO_4*nH_2O(H_3PO_4)_g$ composite to rehydrate at 156° C. after having been dehydrated at 400° C. for 6 hrs. Measurements were taken under flowing air atmospheres with a partial pressure ~0.7 atm.

The composite material has surprising and unexpected advantages over bulk solid acid materials. First, the composite material exhibits a superprotonic-like conductivity far below the phase transition temperatures of the pure solid acid (FIG. 1). For example, solid acid composite $CsH_2PO_4/LaPO_4*nH_2O(H_3PO_4)$ shows superprotonic-like conductivity far below the superprotonic phase transition temperatures of $CsH_2PO_4$. Moreover, the composite material was capable of being dehydrated above 350° C. and then rehydrated below 350° C., a property not possible with a pure solid acid sample (FIGS. 2 and 3). Second, the secondary compound interacts with the solid acid and thermodynamically stabilizes the surface of the solid acid (e.g., with respect to dehydration) by either increasing the effective partial pressure of water at the solid acid's surface or through the formation of a highly stable surface layer phase. For example, secondary compound $LaPO_4*nH_2O(H_3PO_4)$ interacts with $CsH_2PO_4$, then thermodynamically stabilizes the surface of $CsH_2PO_4$. Third, the mechanical properties of the solid acid composites are more favorable with respect to plastic deformation as the solid acid composites reduce express the "superplasicity" of the solid acids in the superprotonic phase and the plastic deformation by twinning found in solid acids at lower temperatures.

III. Proton Conducting Membrane

In one aspect, the proton conducting membranes of the present invention include a solid acid composite. The solid acid composite comprises a solid acid component, wherein the solid acid component is capable of conducting protons in a solid state through a superprotonic mechanism; a secondary component having a plurality of surface hydrogen; and a plurality of interfaces formed by the solid acid component and the secondary component. The composite is formed through the interaction of solid acid and the secondary compound. Preferably, the interactions are hydrogen bonding interactions between the solid acid and the secondary compound. More preferably, the hydrogen bonds are formed between the solid acid and the surface hydrogens of the secondary component.

In another aspect, the present invention provides a proton conducting membrane prepared by contacting a solid acid component with a secondary component having a plurality of surface hydrogen under conditions sufficient to generate a composite, wherein said solid acid component interacts with said secondary component to form a plurality of interfaces. Solid acid composite membrane can be prepared combining the solid acid and the secondary component in a volume ratio from about 9:1 to about 1:1 at ambient temperature or elevated temperatures. For example, a volume ratio of 9:1, 8:1, 7:1, 6:1, 5:1, 4:1, 3:1, 2:1, 1:1.

In some embodiments, the proton conducting membrane comprises a solid acid composite comprising a solid acid of the formula I: $M_aH_b(XO_t)_c$, a secondary component being a compound of the formula VIII: $M'_d(X'O_y)_e*nH_2O(H_fX''O_z)_g$, and interfaces formed by the solid acid and the secondary component, where M and M' are each independently a metal cation as defined above; X, X' and X'' are each independently an element that is capable of forming oxyanions and are as defined above; subscripts a, b, t, c, d, y, e, f and z are each independently a non-negative real number, preferably from 1 to 15, more preferably from 1 to 9, and even more preferably from 1 to 4, such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0.; and n and g are non-negative real numbers with the proviso that n and g are not both equal to zero at the same time, for example, if n=0, then g≠0 and vice versus.

In other embodiments, the proton conducting membrane comprises a solid acid of the formulas Ia, Ib, II, IIa, III, IIIa, IV, V, VI, VIa, VII or VIIa; a secondary compound selected from the group consisting of formula VIII, $SiO_2*xH_2O$, $LaPO_4*xH_2O$, $LaPO_4xH_2O(H_3PO_4)_n$, $CePO_4*xH_2O$ $(H_3PO_4)_n$; and interfaces formed by the solid acid and the secondary compound.

In yet other embodiments, the proton conducting membrane comprises a solid acid of the formulas II, IIa, III, IIIa, IV, V, VI, VIa, VII or VIIa; and a secondary compound including, but not limiting to, $LaPO_4$, $BaSO_4$, $Al_2O_3$, $TiO_2$, $SiO_2$, eulytite compounds listed in Table 1 and eulytite compounds having the general formula $M_4(XO_4)_3$ (M=Na, K, Rb, Ag, Ba, Sr, Ca, La, Ce, Pr, Bi, Pb and; X=Si, Ge, P, As, V, S, Se, Cr).

In still other embodiments, the proton conducting membrane comprises a solid acid of the formulas I, Ia, Ib, II, IIa, III, IIIa, IV, V, VI, VIa, VII or VIIa; a secondary component selected from the group consisting of a polymer, a metal, ceramics and a nanostructure, such as functionalized carbon nanotubes or fullerenes; and a plurality of interfaces formed by the solid acid and the secondary component.

Various methods are available for the preparation of the proton conducting membranes. For example, the membrane can be prepared by mechanically grinding the two components together in a predetermined ratio and mechanically compressing to form a membrane with a desired shape. For example, $CsH_2PO_4/LaPO_4*nH_2O(HPO_4)_g$ can be prepared by mechanically grinding solid acid $CsH_2PO_4$ with secondary compound $LaPO_4*nH_2O(HPO_4)_g$. The proton conducting membrane can also be prepared by co-precipitation from a solution followed by mechanical compressing. For example, a proton conducting membrane of $CsH_2PO_4$ and Nafion can be prepared by co-precipitation from an aqueous solution at about 60° C. In yet another embodiment, the proton conducting membrane can be prepared by melt-processing. For example, a solid acid/poly(imide) composite is prepared by melt-processing of the solid acid onto a preformed membrane containing polyimide.

The proton conducting membrane of the present invention has several unexpected characteristics. The solid acid composite proton conducting membrane has a proton conductivity from about $10^{-3}$ $\Omega^{-1}cm^{-1}$ to about 0.2 $\Omega^{-1}cm^{-1}$ in the temperature ranging from about 130° C. to about 330° C. The composite material or the proton conducting membrane containing the composite material is also capable of being dehydrated above certain temperatures and then rehydrated below certain temperatures, a property not possible with the pure solid acid. For example, solid acid composite $CsH_2PO_4/LaPO_4*nH_2O(HPO_4)_g$ can be dehydrated above 350° C. and then rehydrated below 350° C. (FIGS. 2 and 3).

The present invention also provides a method of rehydrating a solid acid composite or a proton conducting membrane containing the solid acid composite. The method includes contacting the solid acid composite with a water molecule under conditions sufficient for rehydrating. The water can be either in the liquid phase or vapor phase, preferably, the composite is in contact with water vapor between about 100° C. to about 500° C.

A. Membrane Properties

Solid acids have certain characteristics that can be advantageous when used as a proton conducting membrane. The proton transport process does not rely on the motion of hydronium ions, thus solid acids need not be humidified and their conductivity is substantially independent of humidity. Another advantage is that solid acids are generally stable against thermal decomposition at elevated temperatures. The thermal decomposition temperature for some of the solid acids described in this specification can be as high as 350° C.

Since solid acids need not be humidified, solid acid based membranes can be operated at elevated temperatures, e.g. temperatures above 100° C.

The conductivity of solid acids can be purely protonic, or both electronic and protonic depending on the choice of the cation in the oxyanion. That is, by using a given amount of a variable valence element such as V, Cr, Co, Mn or a combination of the variable valence elements, the solid acid can be made to conduct electrons as well as protons.

Another advantage is caused by the structure of the solid acids themselves. Since solid acids are dense, inorganic materials, they are impermeable to gases and other fluids that can be present in the electrochemical environment, e.g., gases and hydrocarbon liquids.

This combination of properties: good conductivity in dry environments, conductivity that can be controlled to be either purely proton conducting or both electron and proton conducting, impermeability to gases and hydrocarbon liquids, serviceability at elevated temperatures, e.g. temperatures over 100° C., and relatively low cost, render solid acids as useful materials for use as membranes in electrochemical devices.

Solid acids exhibit another advantageous property for applications in proton conducting membranes. Under certain conditions of temperature and pressure, the crystal structure of a solid acid can become disordered. Concomitant with this disorder is a high conductivity, as high as $10^{-3}$ to $10^{-2}$ $\Omega^{-1}$ $cm^{-1}$. Because of the high proton conductivity of the structurally disordered state, it is known as a superprotonic phase.

The proton transport is facilitated by rapid reorientations of oxyanions, which occur because of the disorder.

Many solid acids enter a superprotonic state at a temperature between about 50 and about 250° C. at ambient pressures. The transition into the superprotonic phase can be either sharp or gradual. The superprotonic phase is marked by an increase in conductivity, often by several orders of magnitude. At temperatures above the transition temperature, the solid acid is superprotonic and retains its high proton conductivity until the decomposition or melting temperature is reached. The solid acids of the present invention can also be operated at a temperature above the superprotonic transition temperature, and below the decomposition or melt temperature.

B. Structural Binders

In some embodiments, the present invention provides a material comprised of a solid acid composite embedded in a preexisting structure, such as a polymer, a ceramic, glass, a metal or a nanostructure. The solid acid composite provides the desired electrochemical activity, whereas the preexisting structure provides mechanical support and increases chemical stability.

In another embodiment, the present invention further comprises a structural binder. Structural binders useful in the present invention include, but are not limited to, carbon materials, such as graphite, graphite black, acetylene black, carbon black, Vulcan®XC72, and Vulcan®XC72R; a polymer; a ceramic; glass; silicon dioxide; a semiconductor; a nanostructure; and a metal. In some embodiments, the structural binder is electrically conducting. When the structural binder is electrically conducting, the structural binder can be a conducting polymer, conducting ceramic, semiconductor or a metal. Alternatively, when the structural binder is a ceramic, semiconductor or metal, it can be mixed with a polymer. In other embodiments, the structural binder is silicon dioxide. In still further embodiments, the structural binder is quartz. In certain other embodiments, the structural binder is fumed silica or colloidal silica.

When the structural binder is carbon, the structural binder can be graphite, carbon black, a nanostructure, such as carbon nanotubes, and the like. In addition, combinations of the different types of carbon (i.e., carbon black and carbon nanotubes or graphite and carbon nanotubes, for example) are useful as a structural binder of the present invention. One of skill in the art will appreciate that other carbon forms are useful in the present invention.

When the structural binder is silicon dioxide, the structural binder can be quartz, fumed silica, colloidal silica, and the like. One of skill in the art will appreciate that other silicon dioxide structural binders are useful in the present invention.

When the structural binder is a polymer, the structural binder can be electrically conducting or insulating. Electrically conducting polymers include, but are not limited to, poly(vinylpyridine), poly(pyrrole), poly(phenylenevinylene), poly(thiophene), poly(acetylene)poly(aniline), poly(phenylene) and the like. Additional polymers useful in the present invention include high melt temperature thermoplastic or thermoset fluoropolymers (Teflon, TFE, PFA, FEP, Tefzel, Kalrez, and Viton), or high melt temperature polymers (PBI, PES, PMR-15 polyimide matrix resin, EVA, and "nylons" such as PA-6 and PA-6,6). The structural binder can comprise either an electrically conducting polymer, an insulating polymer, or some combination of both. One of skill in the art will appreciate that other types of electrically conducting and insulating polymers are useful in the present invention.

When the structural binder is a metal, the structural binder can be any suitable metal, metal oxide, metal salt, or metal complex using a metal such as those described above. The structural binder can include more than one metal element, and can also incorporate non-metal species in the structural binder.

When the structural binder is a ceramic, the structural binder can be any ceramic stable under fuel cell conditions such as, zirconia ($ZrO_2$), alumina ($Al_2O_3$), titanium dioxide ($TiO_2$), or ceria ($CeO_2$). The structural binder can include more than one ceramic material, as well as non-ceramic species. One of skill in the art will appreciate that other ceramics are useful in the present invention.

When the structural binder is a semiconductor, the structural binder can be any semiconductor stable under fuel cell conditions such as, but not limited to, silicon (Si), silicon carbide (SiC), germanium (Ge), carbon (C, in diamond form), zinc-selenide (ZnSe), gallium-arsenide (GaAs), gallium-nitride (GaN), and indium-phosphide (InP) and the like. The structural binder can include more than one semiconductor material, as well as non-semiconductor species. One of skill in the art will appreciate that other semiconductors are useful in the present invention.

In some embodiments, the present invention provides a proton conducting membrane further comprising a separate conducting material. Separate conducting materials useful in the present invention include, but are not limited to, carbon materials, polymers, ceramics and metals, as described above. In certain other embodiments, the separate conducting material is ionically conducting. Separate conducting materials useful in the current invention include ionically conductive materials such as, scandium doped ceria (SDC, oxygen ion conductor), yttrium stabilized zirconium (YSZ, oxygen ion conductor), and perovskites (e.g., $BaZr_{1-x}$, $Y_xO_3$ and $BaCeO_3$, proton and oxygen ion conductors, respectively). More than one separate conducting material can be used in the structural binders of the present invention. One of skill in the art will appreciate that other conducting materials are also useful in the present invention.

In still other embodiments, the present invention provides a proton conducting membrane comprising a solid acid composite that includes at least one variable valence element.

In a further embodiment, the present invention provides a proton conducting membrane being thermally stable at temperatures above about 100° C. In other embodiments, the proton conducting membrane has a proton conductivity of about $10^{-5}$ $\Omega^{-1}cm^{-1}$ or higher at the temperature of use. In another embodiment, the proton conducting membrane can conduct both protons and electrons. In still another embodiment, the present invention provides a proton conducting membrane comprising additional types of solid acids.

Accordingly, in some embodiments the present invention provides a composite material comprising a solid acid composite embedded in a supporting matrix and operated at a slightly elevated temperature. In such a composite, the solid acid composite is in its superprotonic phase, exhibits high conductivity, and provides the desired electrochemical functions; the support matrix can provide mechanical support, and it can also serve to protect the solid acid from water in the environment. A high temperature of operation can render the solid acid composite into its superprotonic state. A high temperature of operation can also ensure that any water present in the electrochemical device will be present in the form of steam rather than liquid water, making the $H_2O$ less likely to attack the solid acid.

C. Applications of Proton Conducting Membranes

The compounds and proton conducting membranes of the present invention are useful in hydrogen/air fuel cells, hydrogen/oxygen fuel cells direct alcohol fuel cells, hydrogen separation membranes, membrane reactors, supercapacitors, electrochromic displays, hydrogen sensors and other membrane based electrochemical devices. For example, the present invention provides a fuel cell system comprising a proton membrane. The proton membrane includes a solid acid component, a secondary component and hydrogen bonding network interfaces formed by the solid acid and the secondary component. The fuel system provides electrical power to an external device. The present invention also provides a use of the solid acid composite proton conducting membrane for hydrogen separation and in a device selected from the group consisting of a fuel cell, a membrane reactor and a sensor. Other useful applications of the compounds and proton conducting membranes of the present invention will be apparent to one of skill in the art.

1. Hydrogen/Air Fuel Cells

A hydrogen/air fuel cell is one in which the proton conducting membrane is a solid acid composite/matrix composite of the type described herein. Because the membrane need not be humidified, the fuel cell system can be simpler than one which uses a hydrated polymer membrane. The humidification system normally required for fuel cell utilizing a Nafion or related polymer membrane can be eliminated. Hence, less rigid temperature monitoring and control can be used in the solid acid based system as compared with Nafion based fuel cell systems. These differences allow a more efficient cell system.

In certain embodiments, the proton conducting membranes of the present invention have a partial pressure of water of less than 1 atm. In other embodiments, the proton conducting membranes of the present invention have water on the surface of the membrane, but not in the interior of the membrane.

Because the membrane need not be humidified, the hydrogen/air fuel cell can be operated at temperatures above 100° C. The tolerance of the Pt/Ru catalysts to carbon monoxide CO poisoning increases with increasing temperature. Thus, a fuel cell of the instant invention, operated at a temperature above 100° C. can withstand higher concentrations of CO in the hydrogen fuel than a Nafion based fuel cell which is typically operated at a temperature lower than 100° C.

The high temperature of operation also enhances the kinetics of the electrochemical reactions, and can thereby result in a fuel cell with higher overall efficiency.

2. Direct Alcohol Fuel Cells

A direct alcohol fuel cell is constructed using a proton conducting membrane comprising a solid acid composite/matrix support of the type described herein. Useful alcohols include methanol, ethanol, isopropanol, and the like. Because the membrane needs not to be humidified, the fuel cell system is much simpler and thus less costly than state of the art direct alcohol fuel cell systems. The humidification system normally required for fuel cell utilizing a Nafion or related polymer membrane is eliminated. Furthermore, temperature monitoring and control in the solid acid based system does not need to be as tight as in Nafion based fuel cell systems. Because the solid acid composite based membrane needs not to be humidified, the fuel cell can be operated at elevated temperatures. High temperatures can enhance the kinetics of the electrochemical reactions. This results in a fuel cell with very high efficiency.

Another significant advantage of the fuel cell of the instant invention results from the decreased permeability of the membrane to alcohol. Direct alcohol fuel cells, in which Nafion or another hydrated polymer serves as the membrane, alcohol crossover through the polymeric membrane lowers fuel cell efficiencies. The impermeability of a solid acid composite membrane can improve this efficiency.

3. Hydrogen Separation Membranes

The present invention provides a use of the solid acid composite proton conducting membrane for hydrogen separation. The metal catalyst, such as Ru/Pt catalyst in a hydrogen/air fuel cell is sensitive to CO poisoning, particularly at temperatures close to ambient. Therefore, in an indirect hydrogen/air fuel cell, the hydrogen produced by the reformer is often cleaned, of e.g. CO to below 50 ppm, before it enters the fuel cell for electrochemical reaction.

The hydrogen separation membrane contemplated by the instant invention can be made of a mixed proton and electron conducting membrane, as described herein. Hydrogen gas, mixed with other undesirable gases, is introduced onto one side of the membrane. Clean hydrogen gas is extracted from the other side of the membrane.

On the inlet side of the membrane, hydrogen gas is dissociated into $H^+$ and $e^-$. When the membrane is both proton conducting and electron conducting, both of these species can migrate through the membrane. However, the membrane is substantially impermeable to other gases and fluids. Hence, CO and other undesirable gases or fluids cannot so migrate. On the outlet side of the membrane, the $H^+$ and $e^-$ recombine to form hydrogen gas. The overall process is driven by the hydrogen chemical potential gradient, which is high on the inlet side of the membrane and low on the outlet side of the membrane.

Another type of hydrogen separation membrane uses a membrane made of a proton conducting composite of the type described herein, and is connected to a current source. Hydrogen gas, mixed with other undesirable gases, is introduced onto one side of the membrane and clean hydrogen gas is extracted from the other side of the membrane. Application of a current causes the hydrogen gas to dissociate into $H^+$ and $e^-$. As the membrane conducts only protons, these protons are the only species which can migrate through the membrane. The electrons migrate through the current source to the outlet side of the membrane, where the $H^+$ and $e^-$ recombine to form hydrogen gas. The membrane is substantially impervious to other gases and fluids. Hence, CO and other undesirable gases or fluids cannot migrate through the proton conducting membrane. The overall process is driven by electric current applied via the current source.

4. Membrane Reactors

Additional devices incorporating the proton conducting membranes of the present invention include membrane reactors, in which a mixed proton and electron conducting membrane of the type described herein is utilized. The general reaction is that reactants A+B react to form products C+D, where D is hydrogen gas. Use of a mixed proton and electron conducting membrane in this reactor can enhance the reaction to give yields that exceed thermodynamic equilibrium values. On the inlet side of the membrane reactor, the reactants form products $C+H_2$. Under equilibrium conditions, the hydrogen concentration builds up and the forward reaction is slowed. With the use of the mixed hydrogen and electron conducting membrane, the hydrogen is immediately extracted from the reaction region via transport through the membrane, and the forward reaction is enhanced. Examples of reactions in which the yield can be enhanced by using such a membrane reactor include (1) the steam reformation of methane (natural gas) to produce syngas: $CH_4+H_2O \rightarrow CO+3H_2$; (2) the steam reformation of CO to produce $CO_2$ and $H_2$: $CO+H_2O \rightarrow CO_2+H_2$; (3) the decomposition of $H_2S$ to $H_2$ and S, (4) the decomposition of $NH_3$ to $H_2$ and $N_2$; (5) the dehydrogenation of propane to polypropylene; and (6) the dehydrogenation of alkanes and aromatic compounds to various products.

A second type of membrane reaction is one utilizing a mixed proton and electron conducting membrane of the type described herein. In this case, the general reaction is that the reactants A+B form the products C+D, where B is hydrogen. The hydrogen enters the reaction region via transport through the mixed conducting membrane, whereas the reactant A is introduced at the inlet to the membrane reactor, and is mixed with other species. The manner in which the hydrogen is introduced into the reactant stream (through the membrane) ensures that only the reactant A, and none of the other species reacts with hydrogen. This effect is termed selective hydrogenation.

A third type of membrane reaction is one utilizing only a proton conducting membrane of the type described herein. In this case, the general reaction is that the reactants A+B form the product C, where B is hydrogen. The hydrogen enters from the "anode" side of the membrane reactor and is conducted to the reaction region via transport through the proton conducting membrane, whereas the reactant A is introduced on the "cathode" side of the membrane reactor, and is "hydrogenated" at the cathode surface to form the reactant, C. The reactant A may be mixed with other species. The manner in which the hydrogen is introduced into the reactant stream (through the membrane) ensures that only the reactant A, and none of the other species, reacts with hydrogen. This effect is termed selective hydrogenation. For example, ethylene can be hydrogenated to ethane by such a process using such a membrane: $C_2H_4 \rightarrow C_2H_6$.

The mixed proton and electron conducting membranes described herein provide an advantage over state-of-the-art membranes in that the conductivity is high at temperatures as low as 100° C., and the membranes are relatively inexpensive. Selective hydrogenation at temperatures close to ambient can have particular application in synthesis of pharmaceutically important compounds which cannot withstand high temperatures.

D. Preparation of Proton Conducting Membranes

The present invention provides a method for preparing a proton conducting membrane. The method includes contacting a solid acid component with a secondary component having a plurality of surface hydrogen to generate a composite. The method further includes contacting with a structural binder. In some embodiments, the solid acid component and secondary component exist as particles having various shapes, sizes and dimensions. In one embodiment, the formation of the solid acid composite can be realized by mechanically mixing of the solid acid and the secondary compound in the presence or absence of a structural binder. Alternatively, the composite can be formed through co-precipitation.

The proton conducting membranes of the present invention can be prepared by a variety of means. One method involves mechanically pressing an evenly dispersed layer of solid acid composite into a highly dense layer supported on the anode and/or cathode layers. The solid acid composite layer can be compressed at temperatures ranging from ambient to above the melt temperature of the solid acid. Another method involves mixing the solid acid and the secondary compound with a supporting structure that is electrochemically unreactive, to form a composite. A first embodiment uses a solid acid/secondary compound mixed with a melt-processable polymer as the supporting matrix structure. Composite membranes of the solid acid/secondary compound and poly(vinylidene fluoride) can be prepared by simple melt-processing methods. The three components can be lightly ground together then hot-pressed at 180° C. and 10 kpsi for 15 minutes. One of skill in the art will appreciate that additional melt-processable polymers are useful in the present invention, such as those described herein as polymer binders.

Additional methods include mixing a thermoset polymer in monomer or prepolymer form in with the solid acid/secondary compound composite, and then starting the polymerization in situ. For example, composite membranes of the solid acid compound and the polyester resin marketed under the name Castoglas by Buehler, Inc. can be synthesized by lightly grinding the solid acid and pre-polymer together and then adding the crosslinking agent to start the polymerization. Composite membrane of solid acid composite and poly(trimesic acid) can be prepared by grinding and then heating the mixture to 250° C. to start the polymerization.

Various thermoset polymers can be used. For example, poly(dicyclopentadiene) or poly DCPD. In such cases, the solid acid/secondary compound composite is ground and then mixed with the monomer dicyclopentadiene. The polymerization catalyst is introduced into the mixture, which is then poured onto a Teflon plate and pressed into a thin film. The film is cured at 100° C. for approximately 2 hours. One of skill in the art will appreciate that additional thermoset polymers are useful in the present invention.

Another method for preparing solid acid-polymer composites or solid acid-secondary compound-polymer composites is suspension coating. For this, the solid acid/secondary component composite is dissolved in a water-ethanol solution, and the polymer PTFE is dispersed into this solution. A composite membrane is formed by casting the suspension, allowing the solvents to evaporate, and then mechanically pressing at either ambient or elevated temperatures.

When the structural binder is non-polymeric (such as ceramic, glass, or carbon), the solid acid or solid acid-secondary compound composite can be synthesized from aqueous solution and the matrix material is synthesized separately. The two components are then mixed and ground together. The mixture is then pressed at either ambient or elevated temperatures, preferably at an elevated temperature which causes the solid acid and/or polymer to melt and flow, to yield a dense composite membrane.

Electrically conductive composite membranes are prepared by combining at least one solid acid or solid acid-secondary compound composite and an electrically conductive structural binder. The electrically conductive structural binder can be an electronically conducting polymer, such as poly(aniline) or poly(imidazole), or a typical metal, such as aluminum or copper, as well as a conductive carbon material. Where the electronically conducting component is a metal, it can be advantageous to introduce a chemically and electrically inert polymer into the composite simply to serve as a binder and provide the membrane with good mechanical properties. The processing methods described above can be used to prepare such composite membranes.

Electrically conductive composites can also be prepared by performing direct chemical substitutions with variable valence ions. Substitution in the oxyanion or metal cation component with a variable valence element can provide the desired electronic conductivity. Large ions with variable valence, such as thallium, indium, lead and tin can be used for these substitutions. The solid acid or solid acid-secondary compound composite so modified can be used in an electrochemical device directly, or can be combined with a supporting matrix material as described above.

One of skill in the art will appreciate that other methods exist for preparing the membranes of the present invention.

EXAMPLES

Example 1

Preparation of $CsH_2PO_4:LaPO_4*nH_3PO_4$ Solid Acid Composite

Solid acid $CsH_2PO_4$ was prepared according to a reported method (Boysen, D. A., et al. *Science*, 2004, 303, 68-70). $LaPO_4$ was purchased from Alpha Aesar Company. Solid acid composite $CsH_2PO_4:LaPO_4*nH_3PO_4$ was prepared by mechanically mixing a 50:50 mixture by mole fraction of $CsH_2PO_4$ and $LaPO_4*nH_3PO_4$ using a mortar and a pestle at about 23° C. under an ambient pressure. The composite material was used without further purification.

Example 2

Comparison of Conductivity of Pure Solid Acid and Composite

FIG. 1 shows a comparison of the conductivity of pure $CsH_2PO_4$ versus a $CsH_2PO_4/LaPO_4*H_2O(H_3PO_4)_g$ composite material. The composite has higher or equal conductivity to that of pure $CsH_2PO_4$ at all measured temperatures. Measurements were taken upon heating and cooling at 1° C./min, under flowing air atmospheres with a water partial pressure ~0.4 atm.

Example 3

Stability of Solid Acid Composite

FIGS. 2 and 3 illustrate the stability of solid acid composite and the rehydrating of the solid acid composite. The conductivity of the solid acid composite $CsH_2PO_4/LaPO_4*H_2O(H_3PO_4)_g$ can be measured up to 400° C., whereas a sample of pure solid acid $CsH_2PO_4$ would melt at ~330° C., resulting in a short circuit in the experimental setup used. All measurements were taken with heating/cooling rates of 1° C./min, under flowing air atmospheres with a water partial pressure ~0.4 atm. The solid acid composite $CsH_2PO_4/LaPO_4*H_2O(H_3PO_4)_g$ also has the ability to rehydrate at 156° C. after having been dehydrated at 400° C. for 6 hrs, a property not seen in $CsH_2PO_4$.

Example 4

Solid Acid-Silicon Carbide Composite

Figure 4:
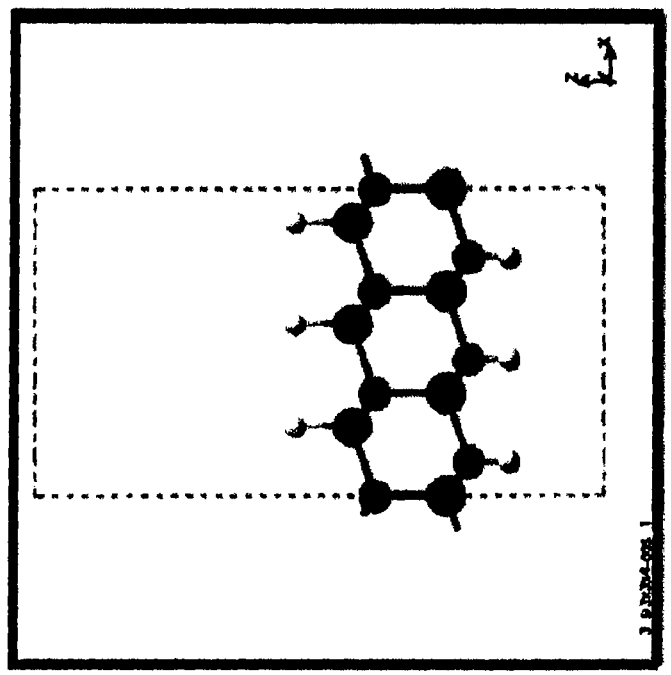
FIG. 4 illustrates a composite membrane prepared from $CsH_2PO_4$ and SiC by mechanical mixing, followed by mechanical or thermal densification.
Figure 4:
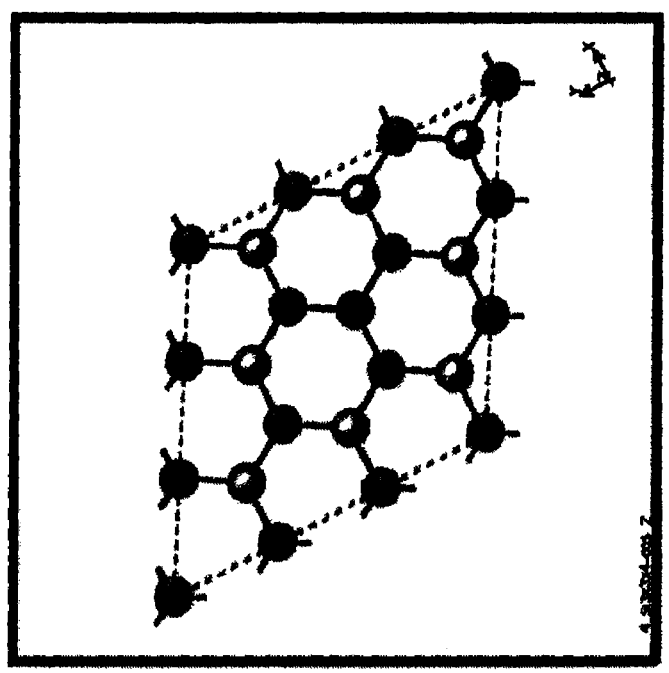

Solid acid $CsH_2PO_4$ is prepared as described above. SiC is purchased from ElectroAbrasives Company. A solid acid composite membrane of $CsH_2PO_4$-silicon carbide is prepared by mechanical mixing a 9:1 volume ratio of $CsH_2PO_4$ and SiC in methanol using a mortar and a pestle at about 23° C. under ambient pressure followed by mechanical or thermal densification. The hydrogen bond donor and/or acceptor molecules are absorbed on the surface of the SiC to provide a surface with active hydrogen bond donors and/or acceptors. The SiC surface containing $H_2O$, $NH_3$ or alcohol has been prepared (FIGS. 4a and 4b). At the interface between the solid acid and silicon carbide, hydrogen bonds are formed between the oxygen and hydrogens of the phosphate groups in the $CsH_2PO_4$ and the absorbed species on the silicon carbide. These hydrogen bonds then form a disordered hydrogen bonded network at the interface leading to increased resistance to mechanical creep for the solid acid component. At the same time, the disordered hydrogen bonded network of the interface results in high conductivity for the membrane.

Example 5

Solid Acid-Trimesic Acid Composite

Solid acid $CsH_2PO_4$ is prepared as described above. Trimesic acid is purchased from Aldrich Chemical Company. A composite membrane of $CsH_2PO_4$ and trimesic acid of the formula: $C_6H_3(COOH)_3$ is prepared by grinding a 95:5 volume ratio of $CsH_2PO_4$ and trimesic acid together using a mortar and a pestle and oven, at about 23° C. under an ambient pressure and then mechanically compressing the mixture into the desired membrane shape. The trimesic acid are then cross-linked to itself by heating at 250° C., to form a polymer support structure in the composite membrane. The hydrogens on the carboxylic groups can then interact with the non-bonded oxygens of $CsH_2PO_4$, while the hydrogens of $CsH_2PO_4$ can form bonds with the double bonded oxygens of the carboxylic groups. Both cases result in hydrogen bonds of medium strength being formed between the solid acid and polymer particles. These bonds are formed at random, greatly enhancing the protonic conductivity at the solid acid/polymer interface. At the same time, the medium strength bonds mechanically strengthen the interaction between solid acid and polymer, thus transferring the mechanical properties of the polymer to the solid acid.

Example 6

Solid Acid-Nafion Composite

Figure 5:
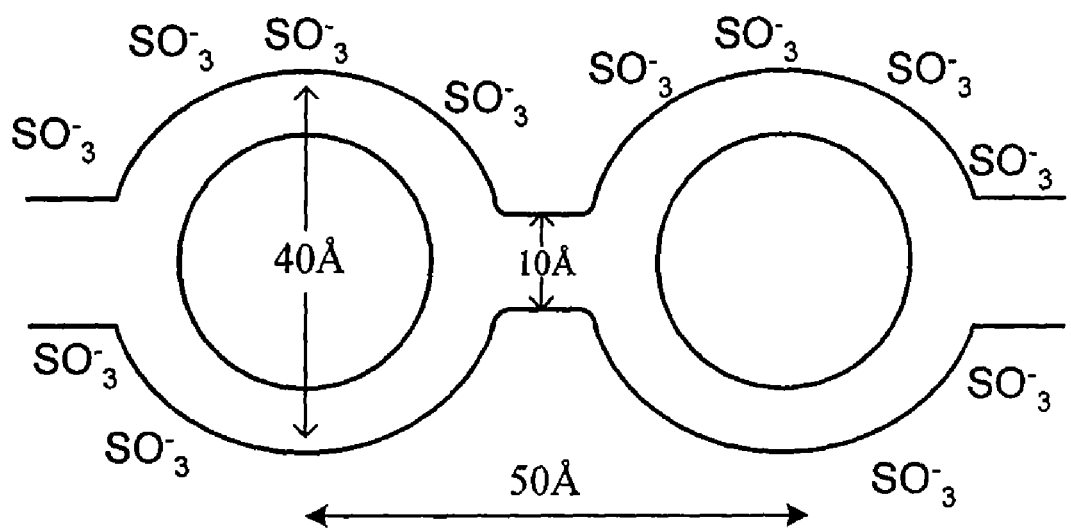
FIG. 5 illustrates an ionomer structure of a sulfonated terafluorethylene.

Solid acid $CsH_2PO_4$ is prepared as described above. Nafion® is purchased from Aldrich Chemical Company. A solid acid composite of $CsH_2PO_4$ and Nafion is prepared by co-precipitation from an aqueous solution at 60° C. A thin film composite useful as a fuel cell membrane is prepared by casting a thin layer of the material in an aqueous solution over a flat oven glass dish surface. The film is then formed by co-precipitation of Nafion and $CsH_2PO_4$ as water is evolved at 60° C. in an oven. The $CsH_2PO_4$ is precipitated in the hydrophilic channels of the Nafion polymer matrix (FIG. 5). The interaction of the acidic $SO_3H$, sulfite groups with the phosphate groups of $CsH_2PO_4$ results in a disordered hydrogen bonded network that simultaneously bonds the $CsH_2PO_4$ to the polymer matrix and also leads to high protonic conductivity at the interface.

Example 7

Solid Acid-Polybenzimidazole Composite

Solid acid $CsH_2PO_4$ is prepared as described above. Polybenzimidazole is synthesized by polymerization of 3,3'-di-aminobenzidine and diphenyl isophthalate according to reported procedures. A solid acid composite membrane of $CsH_2PO_4$ and polybenzimidazole (PBI) is prepared by either precipitation of $CsH_2PO_4$ from aqueous solution into the pores of a PBI membrane, followed by mild mechanical compression, or by simply melting the $CsH_2PO_4$ into the porous PBI membrane at temperatures above 330° C. and $pH_2O \geq 1$ atm. The volume ratio of $CsH_2PO_4$ and PBI is 85:15. The processes are carried out at temperatures from about 23° C. to about 300° C. under ambient pressure. Thin film composite is prepared over a flat oven glass dish surface. In the composite membrane, the hydrogen and nitrogen of the imidazole group can form hydrogen bonds with the phosphate groups of $CsH_2PO_4$. This leads to a dynamically disordered hydrogen bonded network at the interface that both bonds the $CsH_2PO_4$ to the polymer backbone and also leads to a high degree of protonic conductivity. In fact, this is almost the same mechanism as is believed to allow a fairly solid composite to be made from a membrane nearly 80% phosphoric acid (liquid) and 20% PBI (solid) by volume, with excellent protonic conductivity. Similarly, a composite solid acid/PBI composite membrane has high conductivity at operational temperatures with relatively high loadings of polymer (>10% by volume) that give the membrane greatly increased structural integrity.

Example 8

Solid Acid-Polyimide Composite

Figure 6:
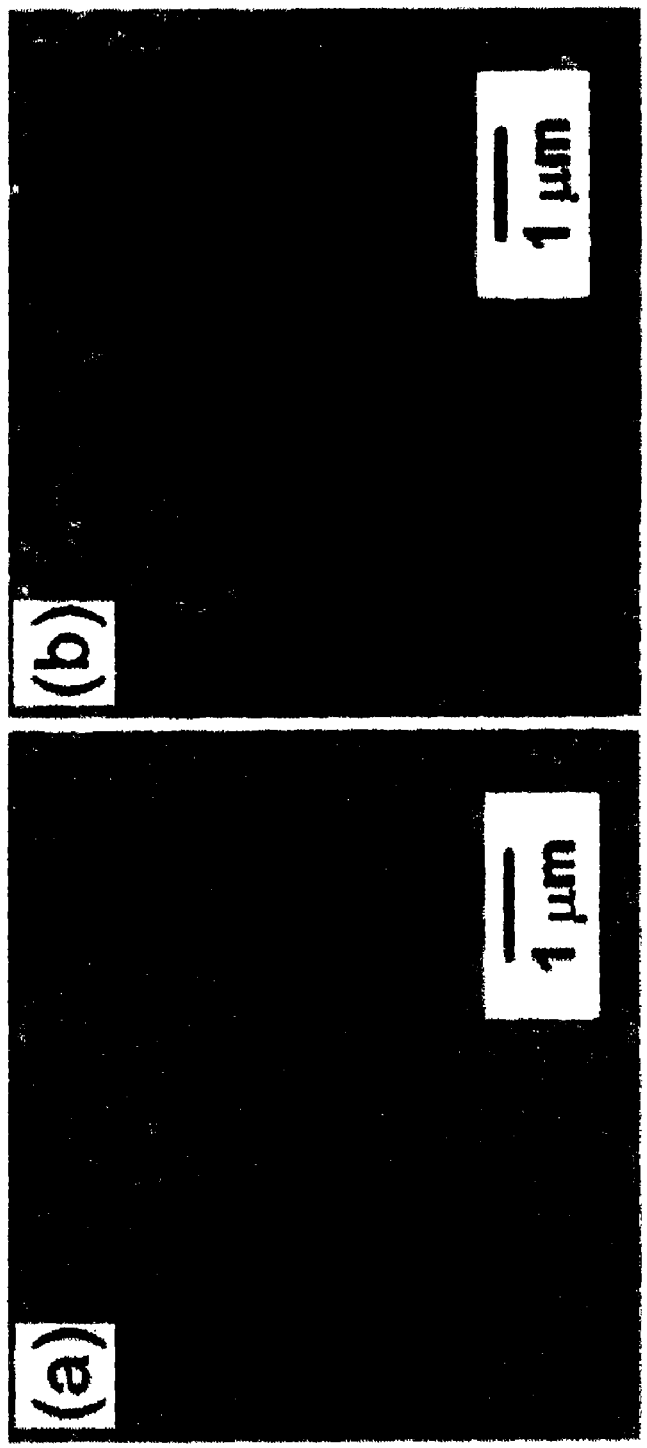
FIG. 6 illustrate scanning electron micrographs of the 3DOM polyimide membrane prepared by using a 550 nm silica template: (a) surface view; and (b) cross-sectional view.

Solid acid $CsH_2PO_4$ is prepared as described above. Polyimide, Kapton® is purchased from Dupont Chemical Company. A solid acid composite membrane of $CsH_2PO_4$ and polyimide is prepared by first creating a polyimide film from polyamic acid in a solvent (Munakata, et al. *Chem. Commun.*, 2005, 3986-3988). The solid acid, $CsH_2PO_4$, is then deposited in the polymer by precipitation from aqueous solution at 60° C. The $CsH_2PO_4$ is then taken above its melt temperature at 330° C., under at water partial pressure of 0.7 atm, and the composite film is densified by mild compression at 50 psi. FIG. 6 shows a scanning electron micrographs of the polyimide membrane matrix. $CsH_2PO_4$ is melted into the pores once filled by the silica spheres in FIG. 6. The volume ratio of $CsH_2PO_4$ and polyimide is 80:20. The processes are carried out at temperatures from about 23° C. to about 300° C. under an ambient pressure. Thin film composite is prepared over a flat oven glass dish surface.

Example 9

Solid Acid-Fullerene Composite

Solid acid $CsH_2PO_4$ is prepared as described above. Muti-walled Fullerene, nanotubes, 20-50 nm OD, 5-20 micron long are purchased from Alfa Aesar Company. The nanotubes are functionalized with carboxylic acid group according to a reported method (Smalley, R. E. et al. *Carbon Nanotubes: Synthesis, Structure, Properties and Applications*, Springer; 1st Ed, 2001; Ajayan, Z. P. et al. "Making Functional Materials with Nanotubes" *Material Res. Soc. Sym. Proc.* 2002, V. 706). A solid acid composite membrane of $CsH_2PO_4$-nanotube is prepared by mechanical mixing a 9:1 volume ratio of $CsH_2PO_4$ and the nanotubes using a mortar and a pestle at about 23° C. under ambient pressure followed by mechanical and/or thermal densification into desired membrane shapes. The composite material can be used without further purification.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A proton conducting membrane, said membrane comprising:
   a solid acid component of the formula $CsH_2PO_4$, wherein said solid acid component is capable of conducting protons in a solid state through a superprotonic mechanism;
   a secondary component having a plurality of surface hydrogen, comprising
      at least one member selected from the group consisting of $LaPO_4 \ast H_2O(H_3PO_4)_g$, SiC, $C_6H_3(COOH)_3$, polybenzimidazole (PBI), polyimide and multi-walled fullerene, wherein
      g is a non-negative real number from 1 to 4; and
   a plurality of interfaces formed by said solid acid component and said secondary component, wherein said solid acid component and said secondary component interact to form a composite.

2. The proton conducting membrane of claim 1, wherein said plurality of interfaces is formed by hydrogen bonding interactions between said solid acid component and said secondary component.

3. The proton conducting membrane of claim 1, wherein said solid acid component comprises a plurality of solid acid particles.

4. The proton conducting membrane of claim 1, wherein said secondary component comprises a plurality of secondary component particles.

5. The proton conducting membrane of claim 1, further comprising a structural binder selected from the group consisting of a polymer, ceramic, glass, a metal, a nanostructure and a mixture thereof.

6. The proton conducting membrane of claim 1, wherein said secondary component comprises a compound having the formula $LaPO_4 \ast nH_2O(H_3PO_4)_g$.

7. The proton conducting membrane of claim 1, wherein said secondary component comprises polybenzimidazole.

8. The proton conducting membrane of claim 1, having a conductivity from about $10^{-3}$ $\Omega^{-1}cm^{-1}$ to about 0.2 $\Omega^{-1}cm^{-1}$ in the temperature range from about 130° C. to about 330° C.

9. The proton conducting membrane of claim 1, further comprising a separate electrically conducting material.

10. The proton conducting membrane of claim 9, wherein the conducting material is selected from the group consisting of a conducting polymer, a metal and a carbon material.

11. The proton conducting membrane of claim 1, wherein said membrane has a proton conductivity of about $10^{-5}$ $\Omega^{-1}cm^{-1}$ or higher at the temperature of utilization.

12. A fuel cell system comprising a proton conducting membrane in accordance with claim 1, wherein the fuel cell system provides electrical power to an external device.

13. A proton conducting membrane, said membrane comprising:
   a plurality of solid acid particles of the formula $CsH_2PO_4$, wherein said plurality of solid acid particles is capable of conducting protons in a solid state through a superprotonic mechanism;
   a plurality of secondary component particles having a plurality of surface hydrogen, each particle comprising:
      at least one member selected from the group consisting of $LaPO_4 \ast H_2O(H_3PO_4)_g$, SiC, $C_6H_3(COOH)_3$, polybenzimidazole (PBI), polyimide and multi-walled fullerene, wherein
      g is a non-negative real number from 1 to 4; and
   a plurality of interfaces formed by said solid acid component particles and said secondary component particles, wherein said solid acid component and said secondary component interact to form a composite.

14. The proton conducting membrane of claim 13, wherein each particle of said plurality of secondary particles has a dimension from about 5 nm to about 50 μm.

15. A method for preparing a proton conducting membrane, said method comprising:
   contacting a solid acid component with a secondary component having a plurality of surface hydrogen under conditions sufficient to generate a composite, wherein said solid acid component interacts with said secondary component to form a plurality of interfaces,
   wherein
   said solid acid component is $CsH_2PO_4$; and
   said secondary component comprises at least one of $LaPO_4*H_2O(H_3PO_4)_g$, SiC, $C_6H_3(COOH)_3$, polybenzimidazole (PBI), polyimide and multi-walled fullerene, wherein
   g is a non-negative real number from 1 to 4.

16. The method of claim 15, further comprising contacting a structural binder.

17. The method of claim 15, wherein said plurality of interfaces is formed by hydrogen bonding interactions between said solid acid component and said secondary component.

* * * * *